United States Patent
Nishizawa et al.

(10) Patent No.: US 7,913,091 B2
(45) Date of Patent: Mar. 22, 2011

(54) AUTHENTICATION SYSTEM, CONSOLIDATION APPARATUS AND PROGRAM

(75) Inventors: Minoru Nishizawa, Fuchu (JP); Hidehisa Takamizawa, Fuchu (JP); Yoshihiro Fujii, Fuchu (JP); Koji Okada, Tokyo (JP)

(73) Assignees: Kabushiki Kaisha Toshiba, Tokyo (JP); Toshiba Solutions Corporation, Tokyo (JP)

( * ) Notice: Subject to any disclaimer, the term of this patent is extended or adjusted under 35 U.S.C. 154(b) by 953 days.

(21) Appl. No.: 11/754,642

(22) Filed: May 29, 2007

(65) Prior Publication Data

US 2007/0283164 A1 Dec. 6, 2007

(30) Foreign Application Priority Data

May 31, 2006 (JP) ................................ 2006-152560

(51) Int. Cl.
G06F 21/00 (2006.01)
H04L 9/32 (2006.01)
H04L 29/06 (2006.01)
G06F 7/04 (2006.01)
G06K 9/00 (2006.01)

(52) U.S. Cl. ........ 713/186; 713/153; 713/161; 713/168; 713/170; 726/4; 726/5; 726/27; 726/28; 726/29; 382/115

(58) Field of Classification Search .................. 713/186, 713/153, 161, 168, 170; 726/4, 5, 27–29; 382/115
See application file for complete search history.

(56) References Cited

U.S. PATENT DOCUMENTS

| | | | |
|---|---|---|---|
| 2004/0186882 A1* | 9/2004 | Ting | 709/202 |
| 2004/0187029 A1* | 9/2004 | Ting | 713/201 |
| 2005/0038893 A1* | 2/2005 | Graham | 709/228 |
| 2005/0154627 A1* | 7/2005 | Zuzek et al. | 705/10 |
| 2007/0061590 A1* | 3/2007 | Boye et al. | 713/186 |
| 2007/0136319 A1* | 6/2007 | Golobay et al. | 707/100 |
| 2007/0189284 A1* | 8/2007 | Kecskemeti | 370/389 |
| 2007/0237149 A1* | 10/2007 | Milstein et al. | 370/392 |
| 2007/0280225 A1* | 12/2007 | Forbes et al. | 370/389 |

FOREIGN PATENT DOCUMENTS

JP 2006-11768 1/2006

OTHER PUBLICATIONS

Koji Okada, et al., "Extensible Personal Authentication Framework using Biometrics and PKI", Pre-Proceedings of the 3$^{rd}$ International Workshop for Applied PKI (IWAP), 2004, 12 pages.

Hidehisa Takamizawa, et al., "An online System Using Biometric Authentication Context", Computer Security Symposium (CSS), 2005, 6 pages.

* cited by examiner

*Primary Examiner* — Aravind K Moorthy
(74) *Attorney, Agent, or Firm* — Oblon, Spivak, McClelland, Maier & Neustadt, L.L.P.

(57) ABSTRACT

Upon receiving server side entity information and a principal confirmation profile request data from a server side entity device, a consolidation apparatus transmits an entity information transmission request to each of a plurality of client side entity devices and receives client side entity information from each of the client side entity devices. Then, it determines the principal confirmation profile ID in each piece of client side entity information and the principal confirmation profile ID in the server side entity information according to the principal confirmation profile ID request information having the highest priority in the principal confirmation profile request data and prepares a routing table information associating the processing capability IDs and the entity IDs corresponding to the determined principal confirmation profile ID, which routing table information is then stored in a memory.

6 Claims, 22 Drawing Sheets

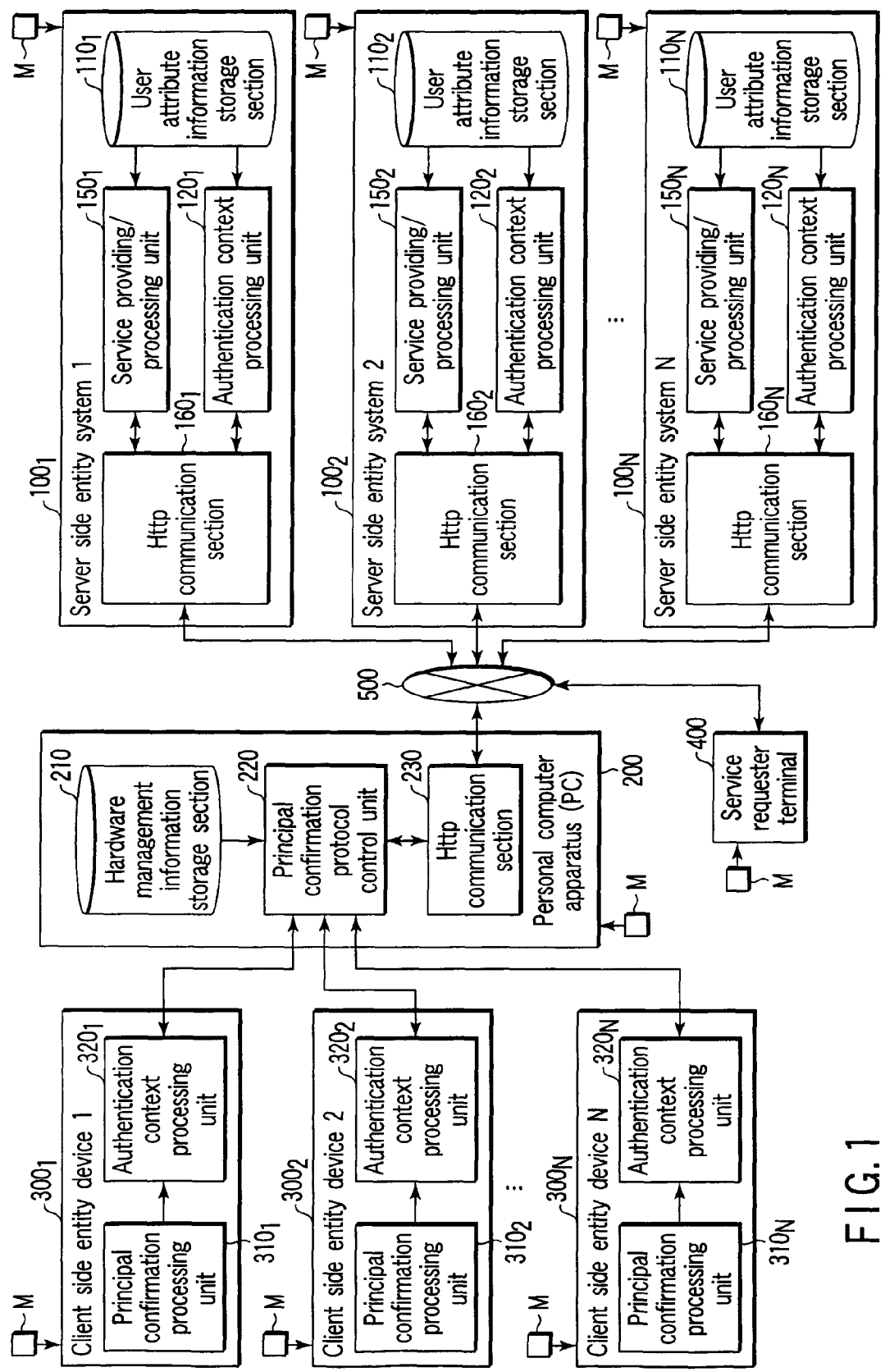
F I G. 1

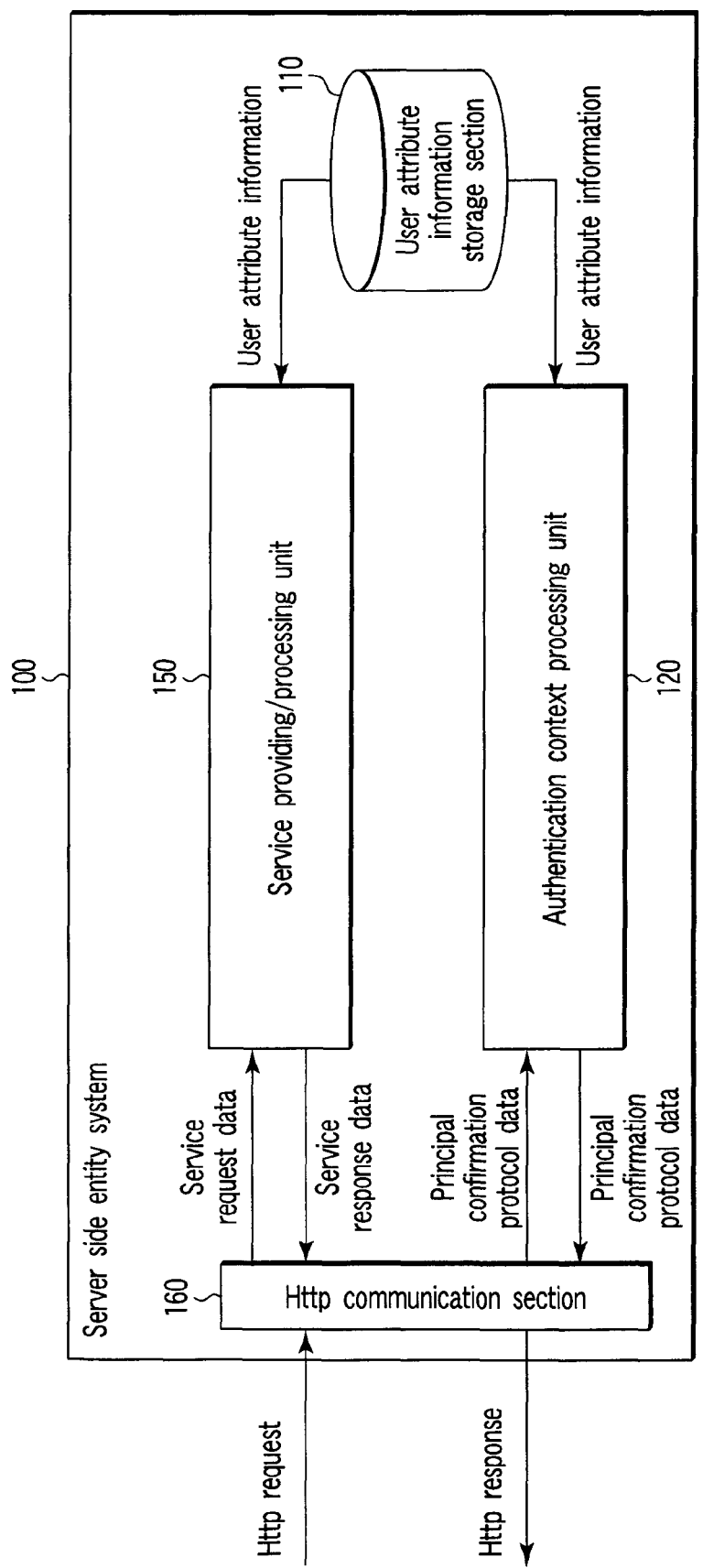
F I G. 2

Entity information 10

| bit<br>byte | 7 | 6 | 5 | 4 | 3 | 2 | 1 | 0 | |
|---|---|---|---|---|---|---|---|---|---|
| 0 | \multicolumn{8}{c}{Entity ID (2Bytes)} | ~11 |
| 1 | | | | | | | | | |
| 2 | Principal confirmation profile information list length (2Bytes) | | | | | | | | ~12 |
| 3 | | | | | | | | | |
| 4 | Number of pieces of principal confirmation profile information (1Bytes) | | | | | | | | ~13 |
| 5 | Principal confirmation profile information list (Variable length) | | | | | | | | ~14 |
| 6 | | | | | | | | | |
| ... | | | | | | | | | |
| N | | | | | | | | | |

FIG. 4

Principal confirmation profile information 14'

| bit<br>byte | 7 | 6 | 5 | 4 | 3 | 2 | 1 | 0 | |
|---|---|---|---|---|---|---|---|---|---|
| 0 | Principal confirmation profile ID (2Bytes) | | | | | | | | ~15 |
| 1 | | | | | | | | | |
| 2 | Version (2Bytes) | | | | | | | | ~16 |
| 3 | | | | | | | | | |
| 4 | Entity processing capability ID (2Bytes) | | | | | | | | ~17 |
| 5 | | | | | | | | | |

FIG. 5

Principal confirmation profile request 20

| bit byte | 7 | 6 | 5 | 4 | 3 | 2 | 1 | 0 | |
|---|---|---|---|---|---|---|---|---|---|
| 0 | Principal confirmation profile request list length (2Bytes) ||||||||  ~21 |
| 1 | ||||||||  |
| 2 | Number of principal confirmation profile ID requests (1Bytes) ||||||||  ~22 |
| 3 | Principal confirmation profile ID request information list (Variable length) ||||||||  ~23 |
| ... | ||||||||  |
| N | ||||||||  |

F I G. 7

Principal confirmation profile ID request 23'

| bit byte | 7 | 6 | 5 | 4 | 3 | 2 | 1 | 0 | |
|---|---|---|---|---|---|---|---|---|---|
| 0 | Principal confirmation profile ID (2Bytes) ||||||||  ~24 |
| 1 | ||||||||  |
| 2 | Version (2Bytes) ||||||||  ~25 |
| 3 | ||||||||  |
| 4 | Priority ||||||||  ~26 |
| 5 | Number of entities (1Bytes) ||||||||  ~27 |
| 6 | Entity processing capability ID list (Variable length) ||||||||  ~28 |
| ... | ||||||||  |
| N | ||||||||  |

F I G. 8

| Preparation process<br>Entity processing capability ID | Data collection | Signal processing | Storage | Matching | Decision | Context verification |
|---|---|---|---|---|---|---|
| 29₁ — 0x0001<br>(e.g., Biometric matching type device) | ○ | ○ | × | ○ | ○ | × |
| 29₂ — 0x0002<br>(e.g., STOC-type IC card) | × | × | ○ | × | × | × |
| 29₃ — 0x0003<br>(e.g., Service providing Web system) | × | × | × | × | × | ○ |
| 29₄ — 0x0004<br>(e.g., Sensor-type device) | ○ | ○ | × | × | × | × |
| 29₅ — 0x0005<br>(e.g., MOC-type IC card) | × | × | ○ | ○ | ○ | × |

*Context verification: a process not defined by principal confirmation preparation process

FIG. 10

Routing table 30

| Entity processing capability ID | Entity ID |
|---|---|
| 29₁ ~ 0x0001 | 0x3a29 ~ 11-310₁ |
| 29₂ ~ 0x0002 | 0x12ef ~ 11-310₂ |
| 29₃ ~ 0x0003 | 0xba7c ~ 11-100 |

F I G. 14

| byte\bit | 7 | 6 | 5 | 4 | 3 | 2 | 1 | 0 | |
|---|---|---|---|---|---|---|---|---|---|
| 0 | \multicolumn{8}{c|}{Destination of transmission entity processing capability ID} | ~51b |
| 1 | \multicolumn{8}{c|}{=0x0001 (Biometric matching type device)} | |
| 2 | \multicolumn{8}{c|}{Source of transmission entity processing capability ID} | ~52b |
| 3 | \multicolumn{8}{c|}{=0x0002 (STOC-type IC card)} | |
| 4 | \multicolumn{8}{c|}{Principal confirmation profile ID=0x0001} | ~53 |
| 5 | | | | | | | | | |
| 6 | \multicolumn{8}{c|}{Sequence number=0x0002} | ~54b |
| 7 | | | | | | | | | |
| 8 | \multicolumn{8}{c|}{Payload length=0x00d4} | ~55b |
| 9 | | | | | | | | | |
| 10 | \multicolumn{8}{c|}{Challenge random number} | ~61a |
| ... | \multicolumn{8}{c|}{(16Bytes)} | |
| 15 | | | | | | | | | |
| 16 | \multicolumn{8}{c|}{Template data length=0x0080} | ~62b |
| 17 | | | | | | | | | |
| 18 | \multicolumn{8}{c|}{Template data} | ~63b |
| ... | \multicolumn{8}{c|}{(128Bytes)} | |
| 145 | | | | | | | | | |
| 146 | \multicolumn{8}{c|}{Biometric authentication context data length of} | ~64b |
| 147 | \multicolumn{8}{c|}{STOC-type IC card=0x0040} | |
| 148 | \multicolumn{8}{c|}{Biometric authentication context of STOC-type IC card} | ~65b |
| ... | \multicolumn{8}{c|}{(64Bytes)} | |
| 211 | | | | | | | | | |

Template delivery data 40b

Header section 50b (bytes 0–9)
Payload section 60b (bytes 10–211)

F I G. 18

Biometric matching outcome delivery data 40c

| byte\bit | 7 | 6 | 5 | 4 | 3 | 2 | 1 | 0 | | |
|---|---|---|---|---|---|---|---|---|---|---|
| 0 | \multicolumn{8}{c|}{Destination of transmission entity processing capability ID =0x0003 (Service providing Web system)} | ~51c | Header section 50c |
| 1 | | | | | | | | | | |
| 2 | \multicolumn{8}{c|}{Source of transmission entity processing capability ID =0x0001 (Biometric matching type device)} | ~52c | |
| 3 | | | | | | | | | | |
| 4 | \multicolumn{8}{c|}{Principal confirmation profile ID=0x0001} | ~53 | |
| 5 | | | | | | | | | | |
| 6 | \multicolumn{8}{c|}{Sequence number=0x0003} | ~54c | |
| 7 | | | | | | | | | | |
| 8 | \multicolumn{8}{c|}{Payload length=0x00d4} | ~55c | |
| 9 | | | | | | | | | | |
| 10 | \multicolumn{8}{c|}{Challenge random number (16Bytes)} | ~61a | Payload section 60c |
| ... | | | | | | | | | | |
| 15 | | | | | | | | | | |
| 16 | \multicolumn{8}{c|}{Biometric authentication context data length of STOC-type IC card=0x0040} | ~64b | |
| 17 | | | | | | | | | | |
| 18 | \multicolumn{8}{c|}{Biometric authentication context of STOC-type IC card (64Bytes)} | ~65b | |
| ... | | | | | | | | | | |
| 145 | | | | | | | | | | |
| 146 | \multicolumn{8}{c|}{Biometric authentication context data length of biometric matching type device=0x0080} | ~66c | |
| 147 | | | | | | | | | | |
| 148 | \multicolumn{8}{c|}{Biometric authentication context of biometric matching type device (128Bytes)} | ~67c | |
| ... | | | | | | | | | | |
| 211 | | | | | | | | | | |

FIG. 19

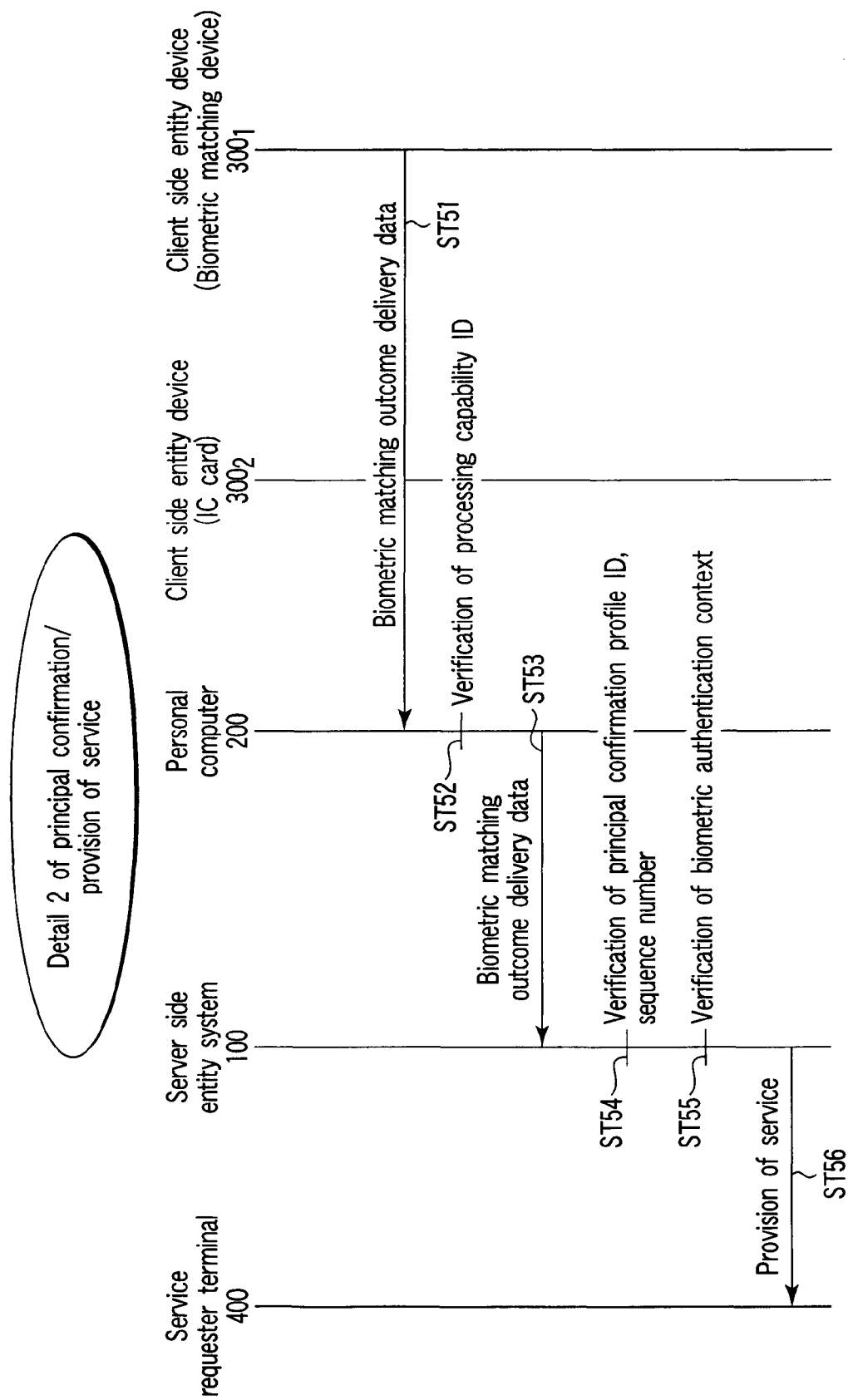
F I G. 24

AUTHENTICATION SYSTEM, CONSOLIDATION APPARATUS AND PROGRAM

CROSS-REFERENCE TO RELATED APPLICATIONS

This application is based upon and claims the benefit of priority from prior Japanese Patent Application No. 2006-152560, filed May 31, 2006, the entire contents of which are incorporated herein by reference.

BACKGROUND OF THE INVENTION

1. Field of the Invention

This invention relates to an authentication system using an entity device and also to a consolidation apparatus and a program.

2. Description of the Related Art

Authentication technologies are important for authentication of the other end of the line when realizing communications and services by way of networks. Authentication technologies have developed in recent years so as to be able to authenticate not only users of service resources but also equipment terminals, keeping pace with the dissemination of open network environments and the development of federation technologies of distributed service resources.

Normally, authentication technologies are required to rigorously identify or verify the object of authentication. When the object to be authenticated is a person, principal confirmation is required to rigorously confirm the identity of the person.

Biometrics (biometric verification/authentication technologies) is highly promising for applications of confirmation of individuals. Biometrics is a technology of verifying a physical/behavioral characteristic or a property of an individual for matching with the biometric information of the individual that is registered in advance (to be referred to as a biometric template hereinafter) to verify the authenticity of the individual.

Fingerprints, irises, retinas, faces, voices, key strokes, signatures can be used as biometric information among others.

In the biometrics, unlike an existing authentication method such as a password, a user's load is reduced because biometric information of which there is no worrying about a loss or forgetting is utilized. In addition, the biometric information presumes that it is difficult to duplicate the information, and is effective to prevent a user spoofing or the like.

However, with biometrics (to be referred to biometric authentication hereinafter), the outcome of matching can be greatly influenced by the environment of authentication unlike password authentication. The outcome of password authentication indicates that the individual is the right person or not regardless of the environment of authentication. In other words, it indicates that the individual is the right person or not regardless of the touch panel of the keyboard that is used for authentication.

To the contrary, the degree of similarity or the like relative to the biometric template exceeds a predetermined threshold value or not is expressed as the outcome of matching of biometric authentication. However, the degree is significantly influenced by the environment of authentication including the type of biometric information and the precision level of the matching device and can fluctuate. This means that biometric authentication does not give rise to any problem when the authentication system is a stationary system and can secure a predetermined operation environment for the system. However, there may arise a problem that the verifier is required to decide the properness of authentication according not only to the outcome of matching but also to the biometric environment of the requester when the authentication system is an open system where a predetermined operation environment cannot be secured for user.

Authentication systems adapted to use an authentication context such as a biometric authentication context are known to dissolve the above-identified problem (see, inter alia, Koji Okada, Tatsuro Ikeda, Hidehisa Takamizawa, Toshiaki Saisho, "Extensible Personal Authentication Framework using Biometrics and PKI, Pre-Proceedings of the 3rd International Workshop for Applied PKI (IWAP2004)", pp. 96-107). An authentication context represents a technology by means of which the management entity (entity device) that executes each of the component processes for confirming the identity of a person assures the outcome of the execution to allow the verifier to verify the properness of the execution of the component processes.

Known techniques realized by applying a biometric authentication context include user authentication systems on open networks (see, inter alia, Hidehisa Takamizawa, Koji Okada, Tatsuro Ikeda, Tomoaki Morijiri, "An Online System Using a Biometric Authentication Context" CSS2005, pp. 313-318). This technique can be used by service providers to authenticate service users to whom services are provided by means of a biometric authentication context and provides the advantages (i) and (ii) listed below.

(i) The service user can select the matching device to be used for principal confirmation.

(ii) The service provider can define the authentication policy according to the biometric environment of the user each time of providing a service.

With this technique, it is possible to verify the biometric environment in addition to the outcome of the principal confirmation process using biometric authentication. Thus, it is possible to provide services flexibly depending on the biometric environment of the users. Thus, it is possible to improve the interoperability and convenience.

However, the inventors of the present invention believe that the known techniques realized by applying a biometric authentication context need to be improved in terms of (a) and (b) listed below, although they normally do not give rise to any particular problem.

(a) When a single entity device is provided with a plurality of types of processes defined as principal confirmation processes, it is not possible to determine which combination is to be used.

For example, IC cards that are a type of entity devices include a store-on-card (STOC) type having a processing capability of storing biometric template and a match-on-card (MOC) type having a processing capability of matching and deciding in addition to a processing capability of storing biometric template. Thus, an IC card provided with both an STOC and an MOC capability cannot determine which capability is to be used when a principal confirmation process using the processing capability of storing biometric template is required by a service provider.

(b) Relating to above (a), there is no consolidation apparatus that can handle messages of communications between a service provider on the Internet and an unspecified number of entity devices connected to users' personal computers.

To be more specific, IC cards of the MOC type and those of the STOC type differ from each other not only in terms of processing capability but also in terms of communication protocol for messages of communications that arise in principal confirmation processes. When a consolidation apparatus is provided to handle messages, it is required to grasp the communication protocol for the MOC type and the communication protocol of the STOC type in advance. In other words, relationship between such a consolidation apparatus and the system including such entity devices and one or more than one service providers shows a strong affinity.

As an influence of such a strong affinity, there arise disadvantages as listed below to stakeholders such as entity device developers/venders and service providers.

Entity device developers/venders and service providers develop apparatus and systems of their own brands and install a new communication protocol and a principal confirmation process there. Then, they have to ask consolidation apparatus developers/venders to install the new communication protocol in the consolidation apparatus that consolidation apparatus developers/vendors market. However, it is a time consuming process to persuade consolidation apparatus developers/vendors to update the consolidation apparatus they market.

On the other hand, on the part of consolidation apparatus developers/vendors, it is time consuming to update the consolidation apparatus they market each time a new communication protocol is defined. Additionally, consolidation apparatus developers/vendors are forced to bear a large burden because a variety of versions of consolidation apparatus are released and marketed.

When a service user purchases a new entity device conforming to a new communication protocol in order to be provided with services conforming to the new communication protocol, he or she cannot actually be provided with the services until new consolidation apparatus conforming to the new communication protocol are released.

Because of the above listed disadvantages, there is no consolidation apparatus that can handle messages of communications between a service provider on the Internet and an unspecified number of entity devices connected to users' personal computers as described in (b) above.

BRIEF SUMMARY OF THE INVENTION

Therefore, it is an object of the present invention to provide an authentication system, a consolidation apparatus and a program that can determine the use of a type of entity device if there are a plurality of types of entity devices where a plurality of processing capabilities are combined and installed.

Another object of the present invention is to provide an authentication system, a consolidation apparatus and a program that can handle communication messages among a plurality of entity devices where a plurality of processing capabilities are combined and installed.

In a first aspect of the present invention, there is provided an authentication system comprising a plurality of client side entity devices to be used for principal confirmation processes utilizing biometric authentication, a server side entity device capable of providing a service to a service requester terminal of a service requester confirmed by way of the principal confirmation process and a consolidation apparatus for mediating communications between each of the client side entity devices and the server side entity device, each of the client side entity devices including: principal confirmation process devices configured to be able to execute a plurality of principal confirmation processes; a client side memory device that stores client side entity information having a plurality of pieces of principal confirmation profile information, each including a principal confirmation profile ID indicating a principal confirmation process of the principal confirmation process device and a processing capability ID indicating the processing capability for the principal confirmation process; a device configured to transmit the client side entity information to the consolidation apparatus upon receiving an entity information transmission request; and authentication context generation devices for generating a biometric authentication context including the outcome of execution of a principal confirmation process by the principal confirmation process device, the server side entity device including: authentication context verification devices for verifying the biometric authentication context; service providing/processing devices configured to provide a service to the service requester terminal of the confirmed service requester when the outcome of the verification indicates properness of the request; a server side first memory device that stores server side entity information having a plurality of pieces of principal confirmation profile information, each including a principal confirmation profile ID indicating a principal confirmation process of the authentication context verification device and a processing capability ID indicating the processing capability for the principal confirmation process; a server side second memory device that stores principal confirmation profile request data having a plurality of pieces of principal confirmation profile ID request information, each including a principal confirmation profile ID, a request priority and a plurality of processing capability IDs for each requested service; and a device configured to transmit the server side entity information and the principal confirmation profile request data to the consolidation apparatus upon receiving a service request, the consolidation apparatus including: a device configured to transmit the entity information transmission request to each client side entity device upon receiving the server side entity information and the principal confirmation profile request data from the server side entity device; a device configured to receive client side entity information from each client side entity device in response to the transmission of the entity information transmission request; a profile ID determination device configured to determine the principal confirmation profile ID in the principal confirmation profile ID of each of the pieces of client side entity information and the principal confirmation profile ID in the server side entity information according to the principal confirmation profile ID request information showing a higher priority in the principal confirmation profile request data out of the pieces of principal confirmation profile ID request information in the principal confirmation profile request data; a routing table preparation device configured to prepare routing table information associating the processing capability ID and the entity ID corresponding to the principal confirmation profile ID with each other according to the determined principal confirmation profile ID; a routing table memory device that stores the routing table information; and a message transfer device configured to transfer a communication message to the entity device having the entity ID corresponding to the processing capability ID showing the destination of transmission according to the routing table information stored in the routing table memory device upon receiving the communication message including a processing capability ID showing the destination of transmission and a processing capability ID showing the source of transmission from a client side entity device or the server side entity device.

While the assembly of apparatus and devices is expressed as a "system" in the above description of the first aspect of the present invention, the present invention is by no means limited thereto and the assembly of apparatus and devices and also each apparatus and each device may be expressed as an "apparatus" or "device", a "method" or "program", or a "computer readable memory medium".

Thus, in the first aspect of the present invention, the server side entity device stores principal confirmation profile request data including a request priority for each requested service and as the consolidation apparatus receives the server side entity information and principal confirmation profile request data from the server side entity device, it transmits an entity information transmission request to each client side entity device and receives the client side entity information from each client side entity device.

Then, the consolidation apparatus determines the principal confirmation profile ID in the client side entity information and the principal confirmation profile ID in the server side entity information according to the principal confirmation profile ID request information showing the highest priority in the principal confirmation profile request data out of the principal confirmation profile ID request information in the principal confirmation profile request data.

Therefore, if there are a plurality of entity devices where a combination of a plurality of processing capabilities is installed, it is possible to select a combination according to request priority.

Additionally, in the first aspect of the present invention, the consolidation apparatus prepares and stores routing table information where the processing capability ID and the entity ID corresponding to the determined principal confirmation profile ID are associated with each other.

Subsequently, the consolidation apparatus transfers a communication message to the entity device having the entity ID corresponding to the processing capability ID showing the destination of transmission according to the routing table information upon receiving the communication message including a processing capability ID showing the destination of transmission and a processing capability ID showing the source of transmission from a client side entity device or the server side entity device.

In this way, it is possible to handle communication messages among a plurality of entity devices where a combination of a plurality of processing capabilities is installed according to routing table information.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a schematic block diagram of an embodiment of authentication system according to the present invention, showing the configuration thereof;

FIG. 2 is a schematic block diagram of the server side entity system of the embodiment of FIG. 1, showing the configuration thereof;

FIG. 4 is a schematic illustration of the configuration of entity information of the embodiment of FIG. 1, showing the data structure thereof;

FIG. 5 is a schematic illustration of the data table of the embodiment of FIG. 1, showing the configuration of principal confirmation profile information;

FIG. 7 is a schematic illustration of the data table of embodiment of FIG. 1, showing the configuration of principal confirmation profile requests;

FIG. 8 is a schematic illustration of the data table of the embodiment of FIG. 1, showing the configuration of principal confirmation profile ID request information;

FIG. 10 is a schematic illustration of the entity processing capability ID definition table of the embodiment of FIG. 1, showing the configuration thereof;

FIG. 14 is a schematic illustration of the routing table of the embodiment of FIG. 1, showing the configuration thereof;

FIG. 18 is a schematic illustration of the data table of the embodiment of FIG. 1, showing the configuration of template sending data;

FIG. 19 is a schematic illustration of the data table of the embodiment of FIG. 1, showing the configuration of biometric matching outcome sending data;

FIG. 24 is a schematic illustration of the sequence of an operation from transmission of data on the biometric matching outcome down to providing a service.

DETAILED DESCRIPTION OF THE INVENTION

Figure 3:
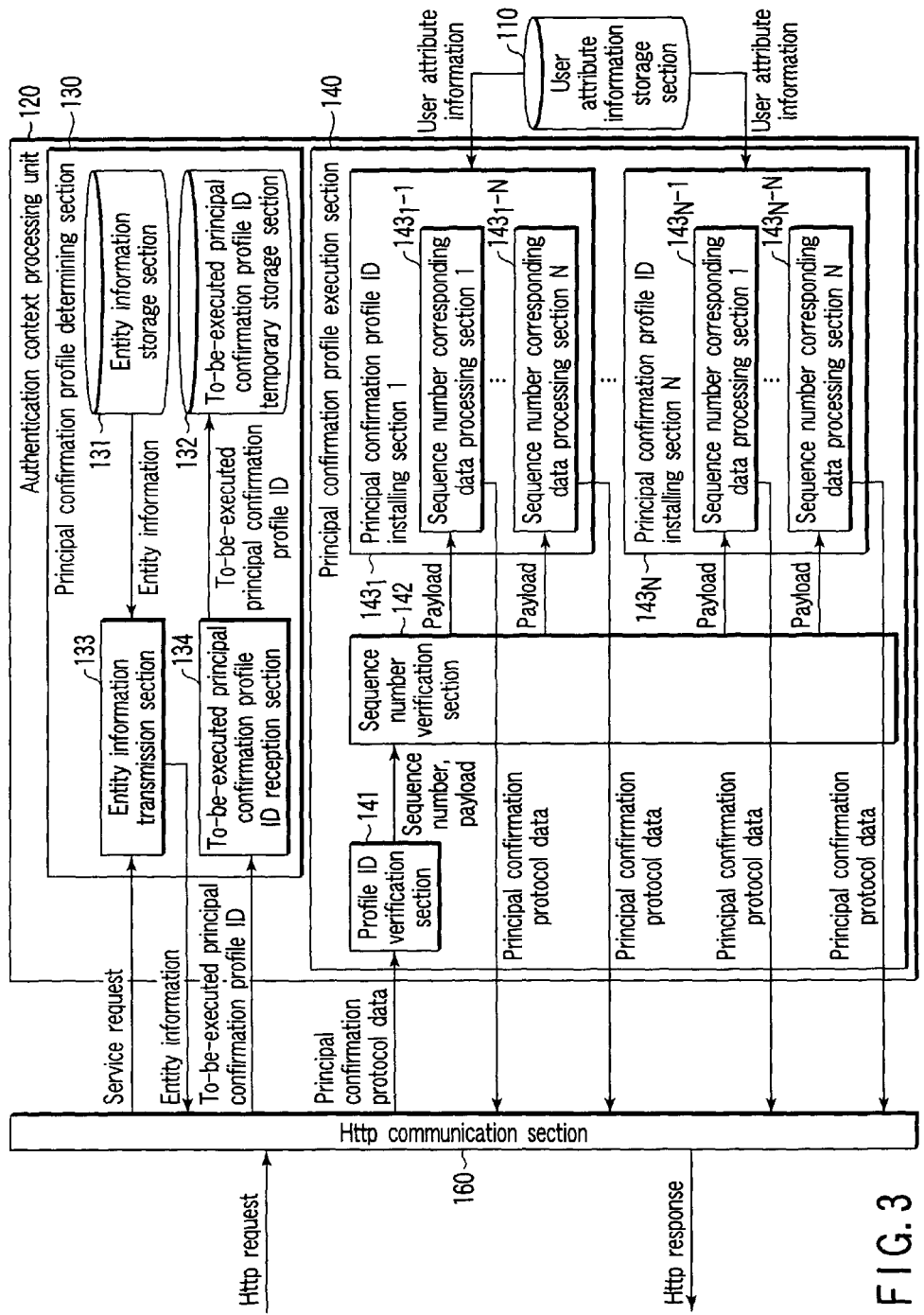
FIG. 3 is a schematic block diagram of the authentication context processing apparatus and the peripheral of the embodiment of FIG. 1, showing the configuration thereof.

Now, the present invention will be described in greater detail by referring to the accompanying drawings that illustrate a preferred embodiment of the invention.

FIG. 1 is a schematic block diagram of an embodiment of online authentication system according to the present invention, showing the overall configuration thereof. Referring to FIG. 1, the authentication system comprises an unspecified number N of server side entity systems (server side entity devices) $100_1$ through $100_N$, a personal computer apparatus (consolidation apparatus) 200, an unspecified number N of client side entity devices $300_1$ through $300_N$ and a service requester terminal 400. The server side entity systems $100_1$ through $100_N$, the personal computer apparatus 200 and the service requester terminal 400 can communicate with each other by way of Internet 500. The personal computer apparatus 200 can communicate with the unspecified number N of client side entity devices $300_1$ through $300_N$ without the Internet 500.

Each of the devices $100_1$ through $100_N$, the apparatus 200, each of the devices $300_1$ through $300_N$ and the terminal 400 can be realized as hardware or as a combination of hardware and software. Software that can be used for such a combination may be a program that is installed from a network or a memory medium M into a corresponding apparatus or device to realize the function of the corresponding apparatus or device, whichever appropriate.

The suffix "N" of the client side entity devices $300_1$ through $300_N$ and the server side entity systems $100_1$ through $100_N$ does not mean that the number of the client side entity devices is same as the number of the server side entity systems. They may normally be different from each other but can be equal to each other.

The server side entity systems $100_1$ through $100_N$ respectively include user attribute information storage sections $110_1$ through $110_N$, authentication context processing units $120_1$ through $120_N$, service providing/processing units $150_1$ through $150_N$ and http communication sections $160_1$ through $160_N$.

Since the server side entity systems $100_1$ through $100_N$ have a same hardware configuration, the suffix is omitted from the description given below by referring to FIGS. 2 and 3 so as to refer to any arbitrarily selected server side entity system and denoted simply by 100.

As shown in FIG. 2, each server side entity system 100 includes a user attribute information storage section 110, an authentication context processing unit 120, a service providing/processing unit 150 and an http communication section 160.

The user attribute information storage section 110 is a memory device from which the authentication context processing unit 120 and the service providing/processing unit 150 can read out data. It stores user attribute information necessary for providing services to the users. User attribute information typically includes service requester IDs, service requesters' public key certificates, address information on service requester terminals 400 and service requesters' accounts settlement information.

The authentication context processing unit 120 has a function of verifying the biometric authentication context including the execution outcome of principal confirmation processes by means of biometric authentications and a function of executing a communication protocol.

More specifically, as shown in FIG. 3, the authentication context processing unit 120 includes a principal confirmation profile determining section 130 and a principal confirmation protocol execution section 140.

The principal confirmation profile determining section 130 determines a principal confirmation profile that defines a combination of entity devices and a communication protocol between entities. A principal confirmation profile defines a communication protocol for principal confirmation using a biometric authentication context, the data format to be exchanged, the processing capability of an entity necessary for principal confirmation and an authentication processing method. A principal confirmation profile can be freely arranged and decided among developer/venders and associated with a principal confirmation profile ID that is a unique ID.

More specifically, the principal confirmation profile determining section 130 includes an entity information storage section 131, a to-be-executed principal confirmation profile ID temporary storage section 132, an entity information transmission section 133 and a to-be-executed principal confirmation profile ID reception section 134.

Figure 6:
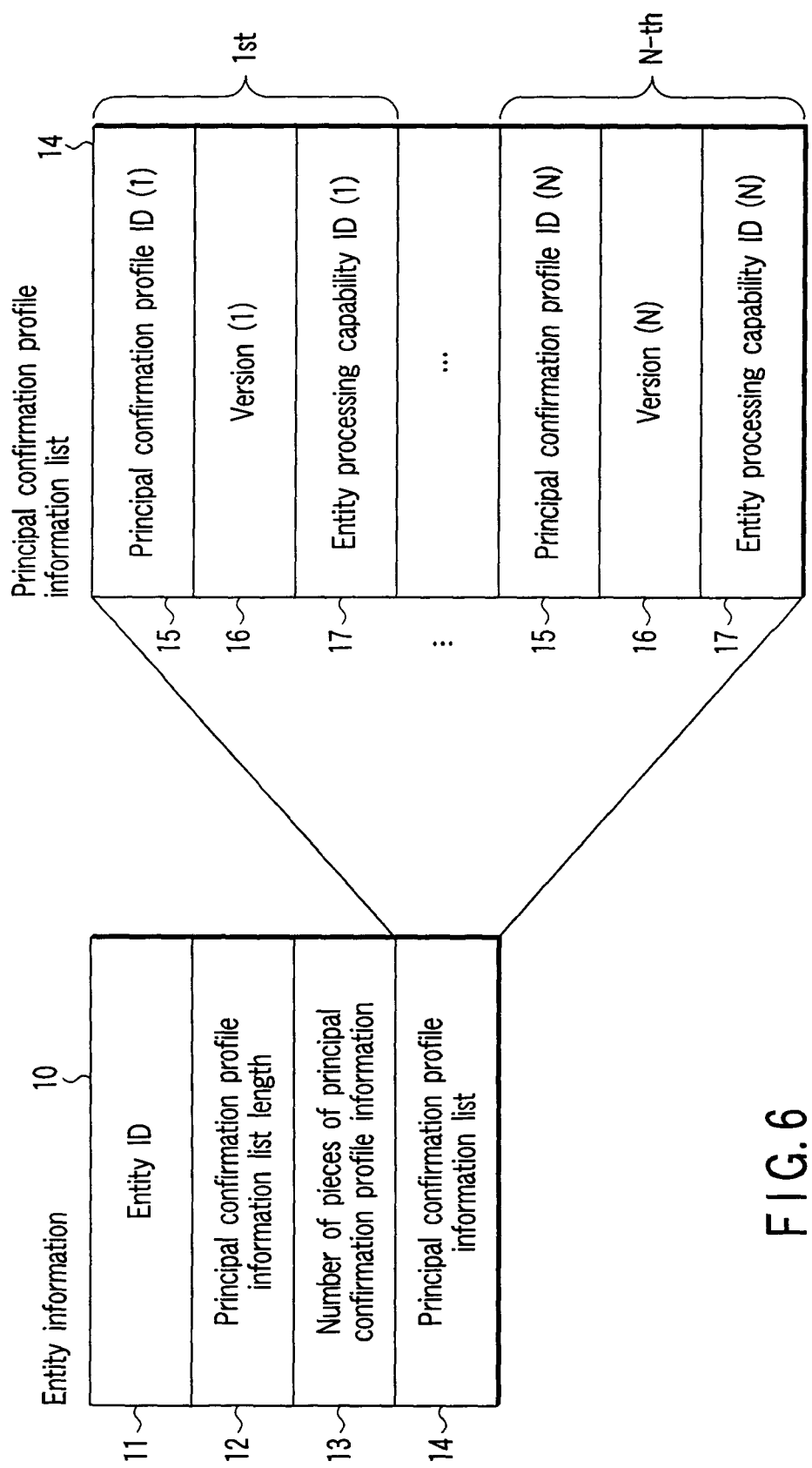
FIG. 6 is a schematic conceptual illustration showing the relationship between entity information and principal confirmation profiles of the embodiment of FIG. 1.

The entity information storage section 131 is a memory device from which the entity information transmission section 133 can read out data. It stores entity information 10 of the server side entity systems $100_1$ through $100_N$ themselves as shown in FIGS. 4 through 6 and principal confirmation profile request data 20 as shown in FIGS. 7 through 10. Principal confirmation profile request data 20 may be associated with service IDs that indicate services to be provided to objects of provision of services and stored. If such is the case, the principal confirmation profile request data 20 can be read out on the basis of the service ID contained in a service request message. A service request message typically contains a service ID and a service requester ID.

As shown in FIG. 5, the entity information 10 of each server side entity system contains four data including an entity ID 11, a principal confirmation profile information list length 12, the number of pieces of principal confirmation profile information 13 and a principal confirmation profile information list 14.

The entity ID 11 is a unique ID assigned to each of the client side entity devices $300_1$ through $300_N$ and the server side entity systems $100_1$ through $100_N$.

The principal confirmation profile information list length 12 indicates the size of a principal confirmation profile information list.

The number of pieces of principal confirmation profile information 13 indicates the number of pieces of principal confirmation profile information contained in the principal confirmation profile information list 14.

The principal confirmation profile information list 14 shows principal confirmation profile information 14' as illustrated in FIG. 5 in the form of a list. As for the relationship of the entity information 10 and the principal confirmation profile information 14', entity information 10 includes principal confirmation profile information 14' as part thereof as shown in FIG. 6.

The principal confirmation profile information 14' is actually three sets of data including the data of the principal confirmation profile ID 15, that of the version 16 and that of the entity processing capability ID 17.

The principal confirmation profile ID 15 is a unique ID assigned according to the type of principal confirmation protocol as in the case of the principal confirmation profile ID 24 of the principal confirmation profile ID request information 23' as shown in FIG. 8.

The version 16 indicates the update management information of the principal confirmation profile ID 15 as in the case of the version 25 of the principal confirmation profile ID request information 23' as shown in FIG. 8.

The entity processing capability ID 17 indicates one of the entity processing capability IDs 291 through 295 shown in the entity processing capability definition table 29 in FIG. 10 as the processing capability that the entity itself possesses.

On the other hand, the principal confirmation profile request data 20 include a principal confirmation profile request list length 21, the number of principal confirmation profile ID requests 22 and a principal confirmation profile ID request information list 23 as shown in FIG. 7.

The principal confirmation profile request list length 21 indicates the data length of the principal confirmation profile ID request information list 23. The number of principal confirmation profile ID requests 22 indicates the number of pieces of principal confirmation profile ID request information of FIG. 8 that is contained in the principal confirmation profile ID request information list 23. The principal confirmation profile ID request information list 23 indicates as many pieces of principal confirmation profile ID request information 23' as the number of requests defined by the number of principal confirmation profile ID requests 22 and shown in a list format.

The principal confirmation profile ID request information 23' is actually five data including the data of the principal confirmation profile ID 24, that of the version 25, that of the request priority 26, that of the entity number 27 and that of the entity processing capability ID list 28.

The principal confirmation profile ID 24 is the unique ID assigned according to the type of principal confirmation protocol.

The version 25 indicates the update management information of the principal confirmation profile ID 24.

The request priority 26 indicates the priority of the principal confirmation protocol that the server side entity system 100 requests.

The entity number 27 indicates the number of entities necessary for effectuating the principal confirmation protocol that the principal confirmation profile ID 24 shows.

Figure 9:
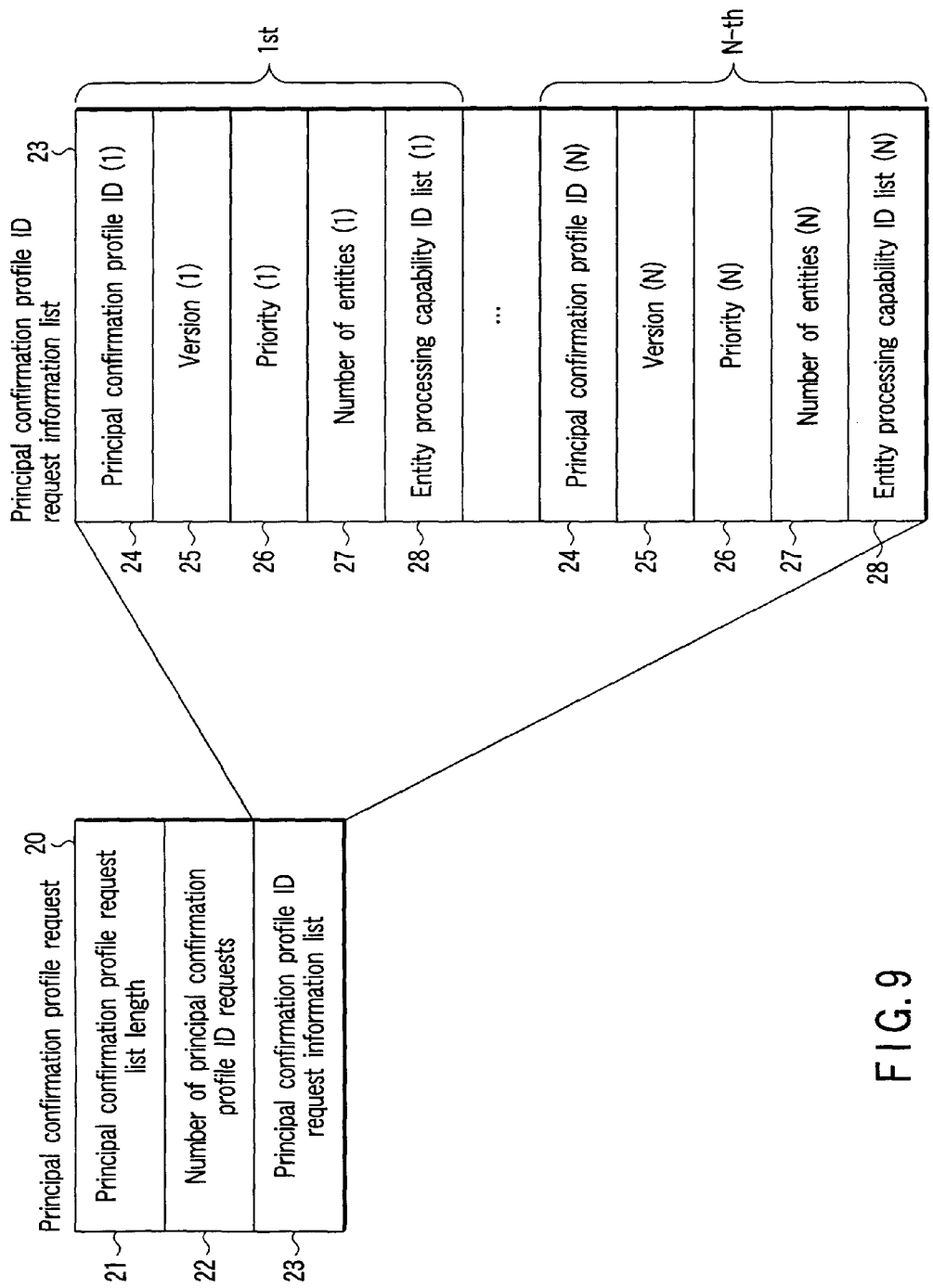
FIG. 9 is a schematic conceptual illustration of the relationship between principal confirmation profile requests and principal confirmation profile request information of the embodiment of FIG. 1.

The entity processing capability ID list 28 shows the processing capabilities of the entities necessary for effectuating the principal confirmation protocol collectively as a list of the entity processing capability IDs 291 through 295 shown in the entity processing capability definition table 29 in FIG. 10. As for the relationship of the principal confirmation profile request data 20 and the principal confirmation profile ID request information 23', the principal confirmation profile request data 20 include the principal confirmation profile request information 23' as part thereof as shown in FIG. 9.

The to-be-executed principal confirmation profile ID temporary storage section 132 temporarily stores the to-be-executed principal confirmation profile IDs written from the to-be-executed principal confirmation profile ID reception section 134.

The entity information transmission section 133 has a function of transmitting the principal confirmation profile request data and the entity information read out from the entity information storage section 131 to the principal confirmation protocol control unit 220 by way of the http communication section 160 according to the service request message received from the service requester terminal 400.

The to-be-executed principal confirmation profile ID reception section 134 receives to-be-executed principal confirmation profile IDs from the principal confirmation protocol control unit 220 and also has a function of writing the to-be-executed principal confirmation profile IDs it receives in the to-be-executed principal confirmation profile ID temporary storage section 132.

The principal confirmation protocol execution section 140 has a function of executing a communication process with the principal confirmation protocol control unit 220 of the personal computer apparatus 200 and that of checking principal confirmation profile ID and the sequence number contained in the principal confirmation protocol data and the payload.

The principal confirmation protocol execution section 140 includes a profile ID verification section 141, a sequence number verification section 142 and principal confirmation profile ID installing sections $143_1$ through $143_N$.

The profile ID verification section 141 has a function of verifying that the principal confirmation profile ID in the principal confirmation protocol data received at the http communication section 160 and the to-be-executed principal confirmation profile ID are same and identical, and reading out the sequence number and the payload from the principal confirmation protocol data and that of sending out the sequence number and the payload it reads out to the sequence number verification section 142.

The sequence number verification section 142 has a function of identifying the principal confirmation profile ID installing section $143_j$ ($1 \leq j \leq N$) that agrees with the to-be-executed principal confirmation profile ID stored in the to-be-executed principal confirmation profile ID temporary storage section 132 and that of inputting the payload from the identified principal confirmation profile ID installing section $143_j$ into the sequence number corresponding data processing section $141_j$ that corresponds to the sequence number taken out from the profile ID verification section 141.

The principal confirmation profile ID installing section $143_1$ through $143_N$ respectively have sequence number corresponding data processing sections $143_1$-1 through $143_1$-N, . . . , $143_N$-1 through $143_N$-N that correspond to the sequence numbers defined by the corresponding communication protocol for each principal confirmation profile ID. A principal confirmation profile ID, a sequence number and a communication protocol are associated with each other and installed in each of the sequence number corresponding data processing sections $143_1$-1 through $143_1$-N, . . . , $143_N$-1 through $143_N$-N.

Figure 11:
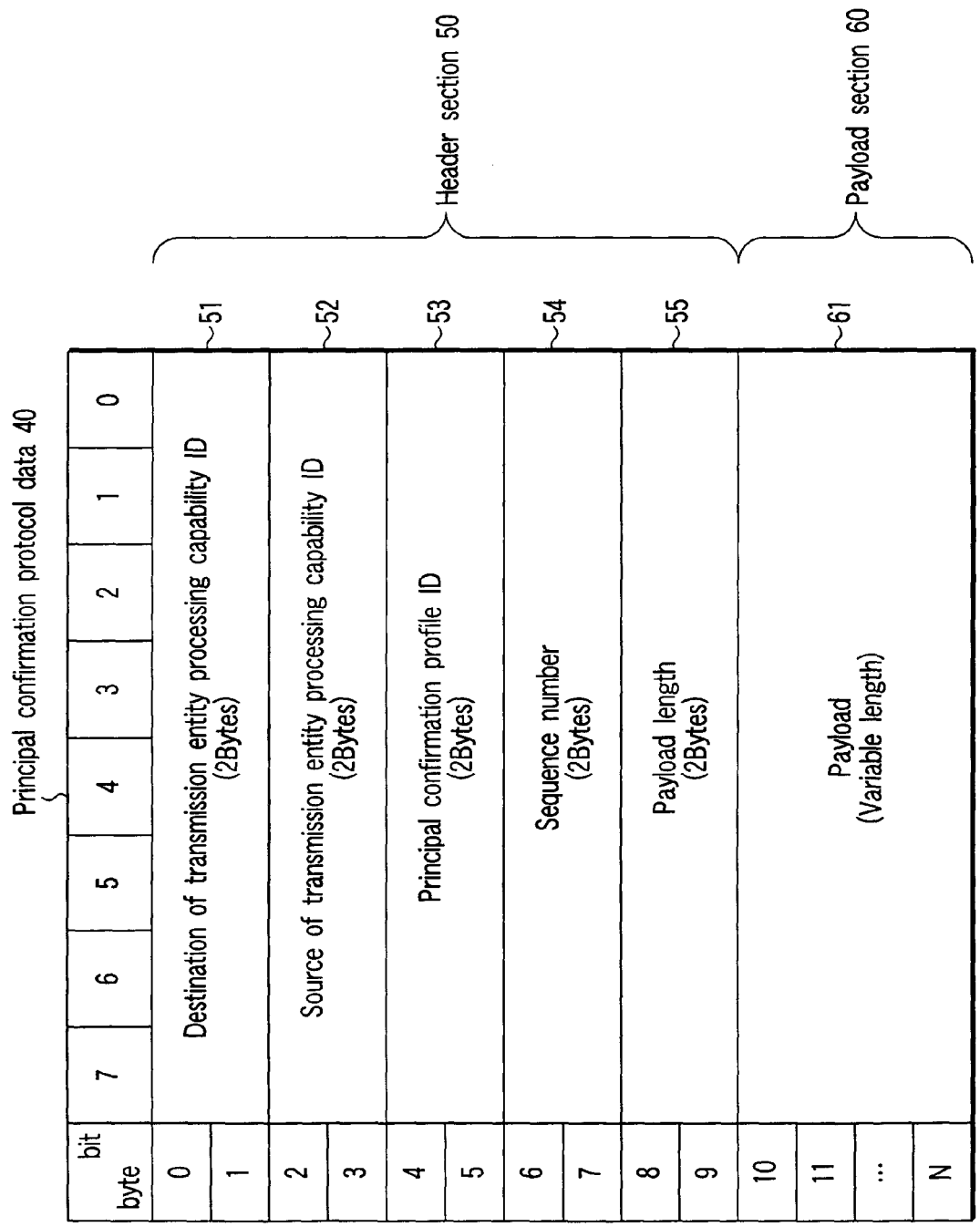
FIG. 11 is a schematic illustration of the data table of the embodiment of FIG. 1, showing the configuration of a model of principal confirmation protocol.

Now, the format of the principal confirmation protocol data used in a principal confirmation protocol will be described below. FIG. 11 is a schematic illustration of the data table of this embodiment, structurally showing the format of the principal confirmation protocol data. In FIG. 11, the principal confirmation protocol data format 40 roughly includes a header section 50 and a payload section 60.

The header section 50 is a common data group that is not dependent on the type of principal confirmation profile ID and includes a destination of transmission entity processing capability ID 51 that shows the destination of transmission of the principal confirmation protocol data, a source of transmission entity processing capability ID 52 that shows the source of transmission of the principal confirmation protocol data, a principal confirmation profile ID 53 that defines the specification of the protocol data itself, a sequence number 54 that shows the sequence number of the principal confirmation protocol specified by the principal confirmation profile ID and a payload length 55 that indicates the data length of the payload section.

The payload section 60 is a data section that can be freely define the message to be exchanged by means of the principal confirmation profile according to each principal confirmation profile ID and only has payload 60.

All the principal confirmation protocol data (40a through 40c), which will be described in greater detail hereinafter, are defined by means of the principal confirmation protocol data format 40 illustrated in FIG. 11.

Figure 12:
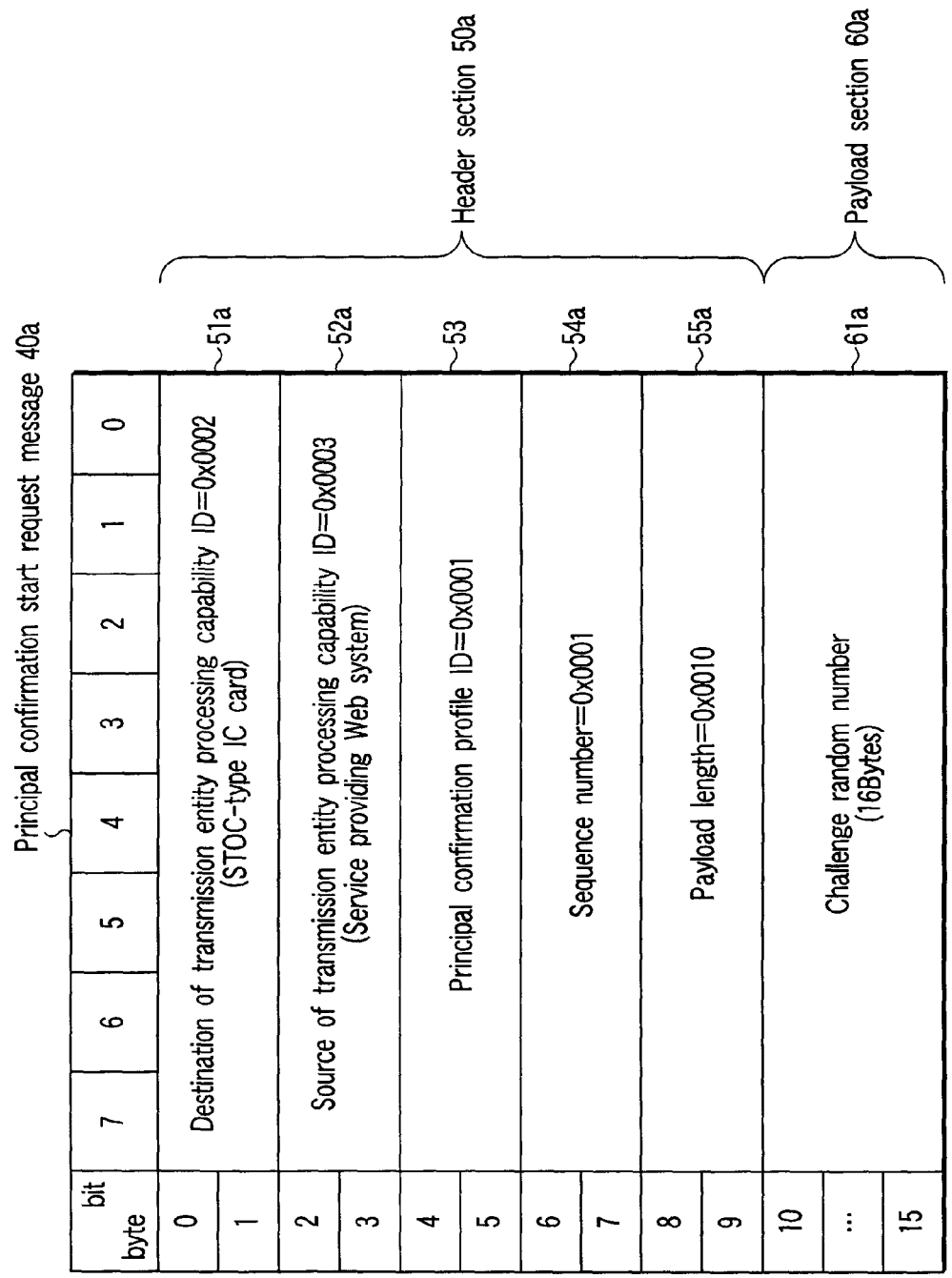
FIG. 12 is a schematic illustration of the data table of the embodiment of FIG. 1, showing the configuration of a principal confirmation start request message.

For example, as shown in FIG. 12, a principal confirmation start request message (principal confirmation protocol) 40a is prepared according to the principal confirmation protocol of the principal confirmation profile ID. The ID of the STOC-type IC card $29_2$ that is defined in the entity processing capability definition table 29 of FIG. 10 is specified for the source of transmission entity processing capability ID 51*a*. The ID of the service providing Web system 29$_3$ that verifies the context is specified for the destination of transmission entity processing capability ID 52*a*. The to-be-executed principal confirmation profile ID in the to-be-executed principal confirmation profile ID temporary storage section 132 is specified for the principal confirmation profile ID 53. The sequence number selected by the principal confirmation protocol is specified for the sequence number 54*a*. The data length of the payload section 60*a* is specified for the payload length 55*a*. The random number 61*a* that operates as challenge data, with which the server side entity system 100$_1$ verifies the biometric authentication context, is specified for the payload section 60*a*.

When the outcome of the verification of the biometric authentication context by the authentication context processing unit 120 is a proper one, the service providing processing unit 150 operates to actually provide a service to the service requester by way of the service requester terminal 400. The object to be provided such as an appropriate business logic program or a content data to be provided as service to the service requester is installed in it. More specifically, the service ID and the object to be provided are associated with each other and stored in the service providing processing unit 150, which service providing processing unit 150 has a function of transmitting the object to be provided that corresponds to the service ID upon receiving the outcome of the verification that indicates properness, the service ID and the service requester ID from the authentication context processing unit 120. Note that the object to be provided is not limited to the program or the data stored in advance but may be the data obtained as a result of executing the program that is stored in advance. When transmitting the object, it is only necessary to read out the address information of the service requester terminal 400, referring to the user attribute information storage section 110. The service ID and the service requester ID are contained in the service requester message received from the service requester terminal 400.

As for the processing capability of the server side entity system 100$_1$, the entity processing capability ID 293 in the entity processing capability ID definition table 29 is installed with a service providing Web system (=0x0003) according to the determined principal confirmation profile ID. It is capable of executing a context verification process at the authentication context processing unit 120.

The http communication section 160 is adapted to perform http communication relative to the client side personal computer apparatus 200 by means of the Internet 500.

Figure 13:
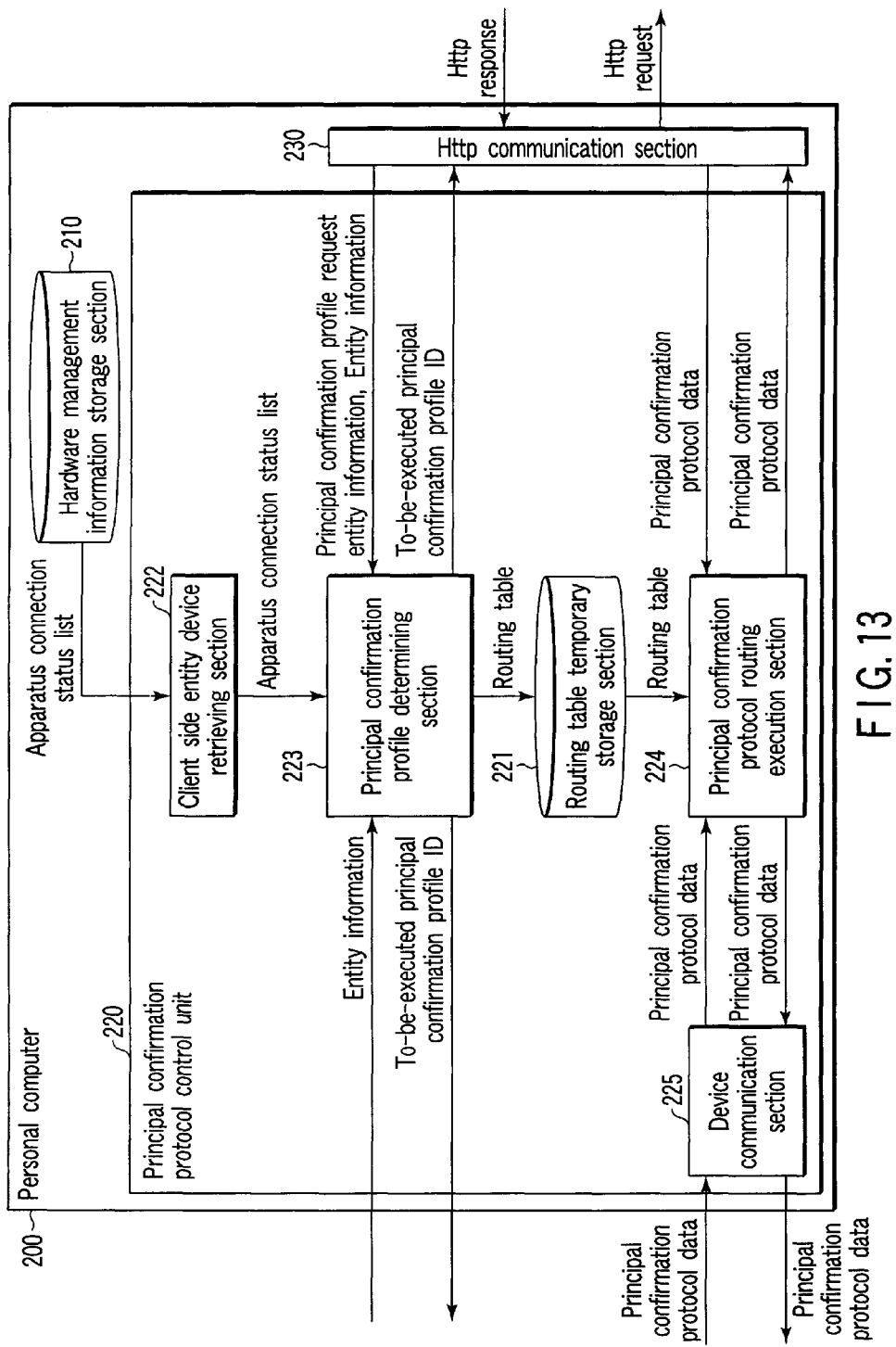
FIG. 13 is a schematic block diagram of the principal confirmation protocol control apparatus of the embodiment of FIG. 1, showing the configuration thereof.

As shown in FIG. 13, the personal computer apparatus (consolidating apparatus) 200 includes a hardware management information storage section 210, a principal confirmation protocol control unit 220 and an http communication section 230.

The hardware management information storage section 210 stores management information on the connected hardware (client side entity devices 300$_1$ through 300$_N$) and is installed in the operating system (to be referred to as OS hereinafter) of the personal computer apparatus 200.

The principal confirmation protocol control unit 220 mediates the communications with the client side entity devices 300$_1$ through 300$_N$ and the server side entity devices 100$_1$ through 100$_N$ and is formed by middleware that operate on the OS.

The principal confirmation protocol control unit 220 includes a routing table temporary storage section 221, a client side entity device retrieving section 222, a principal confirmation profile determining section 223, a principal confirmation protocol routing execution section 224 and a device communication section 225.

The routing table temporary storage section 221 temporarily stores the routing table obtained as a result of a principal confirmation profile determining process. The routing table 30 is a data table where entity processing capability IDs and entity IDs are associated with each other as shown in FIG. 14.

The client side entity device retrieving section 222 is adapted to retrieve any of the client side entity devices 300$_1$ through 300$_N$ out of the hardware management information storage section 210.

The principal confirmation profile determining section 223 determines the principal confirmation profile that defines combinations of entity devices and communication protocols among entities.

Figure 15:
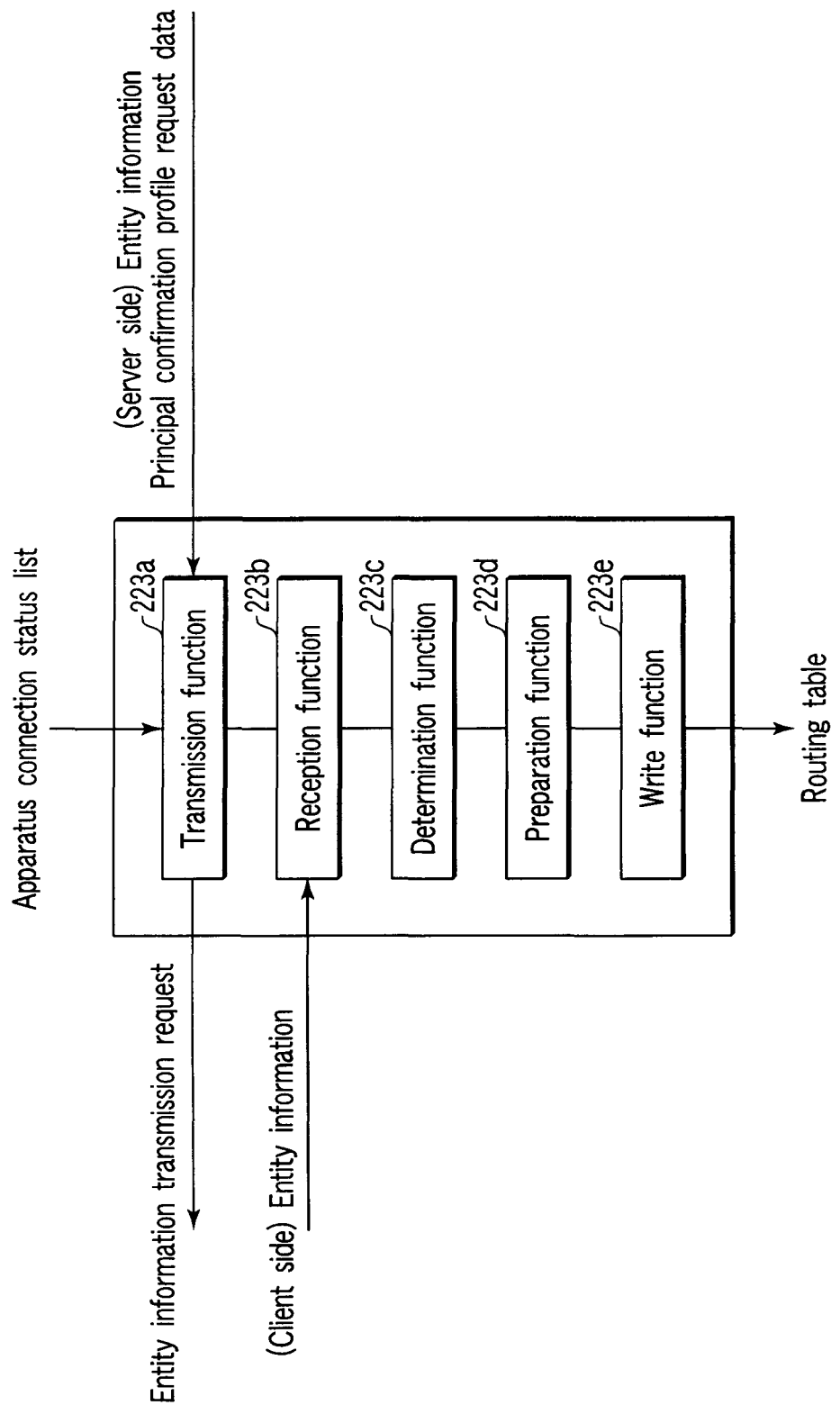
FIG. 15 is a schematic illustration of the principal confirmation profile determining section of the embodiment of FIG. 1, showing the configuration thereof.

More specifically, the principal confirmation profile determining section 223 has a transmission function 223*a*, a reception function 223*b*, a determination function 223*c*, a preparation function 223*d* and a write function 223*e* as shown in FIG. 15.

The transmission function 223*a* is a function of transmitting an entity information transmission request to each of the client side entity devices 300$_1$ through 300$_N$ according to a device connection status list upon receiving (server side) entity information 10 and principal confirmation profile request data 20 from the server side entity system 100.

The reception function 223*b* is a function of receiving (client side) entity information from each of the client side entity devices 300$_1$ through 300$_N$ in response to the transmission of an entity information transmission request.

The determination function 223*c* is a function of determining a principal confirmation profile ID 15 in each piece of the (client side) entity information 10 and a principal confirmation profile ID 15 in the (server side) entity information 10 according to the principal confirmation profile ID request information 23' having the highest request priority 26 in the principal confirmation profile request data 20 out of the pieces of principal confirmation profile ID request information 23 in the principal confirmation profile request data 20.

The preparation function 223*d* is a function of preparing a routing table 30 where the processing capability ID 29 corresponding to the principal confirmation profile ID and the entity ID 11 are associated with each other according to each principal confirmation profile ID 15 that is determined.

The write function 223*e* is a function of writing the prepared routing table 30 in the routing table temporary storage section 221.

The principal confirmation protocol routing execution section 224 controls the message defined by the communication protocol of the principal confirmation process that corresponds to the to-be-executed principal confirmation profile ID, or the communication of the principal confirmation protocol data. It has a function of transmitting the message to any of the client side entity devices 300$_1$ through 300$_N$ and the server side entity system 100 according to the destination or destinations of transmission in the data.

More specifically, as the principal confirmation protocol routing execution section 224 receives principal confirmation protocol data 40 that is a communication message including a processing capability ID 51 that indicates the destination of transmission and a processing capability ID 52 that indicates the source of transmission from the client side entity device 300$_1$, 300$_2$ or the server entity system 100, it transfers the principal confirmation protocol data 40 to the entity device 300$_1$, 300$_2$ or the server side entity system 100 having the entity ID 11 that corresponds to the processing capability ID 29 indicating the destination of transmission according to the routing table 30 in the routing table temporary storage section 221.

The device communication section 225 communicates with the client side entity devices $300_1$ through $300_N$. For example, it transmits and receives principal confirmation protocol data.

The http communication section 230 communicates with the server side entity systems $100_1$ through $100_N$ for http communications.

On the other hand, the client side entity devices $300_1$ through $300_N$ respectively have principal confirmation processing units $310_1$ through $310_N$ and authentication context processing units $320_1$ through $320_N$.

Since the client side entity devices $300_1$ through $300_N$ have a same hardware configuration, the suffix is omitted from the description given below by referring to FIG. 16 so as to refer to any arbitrarily selected client side entity device and denoted simply by 300.

Figure 16:
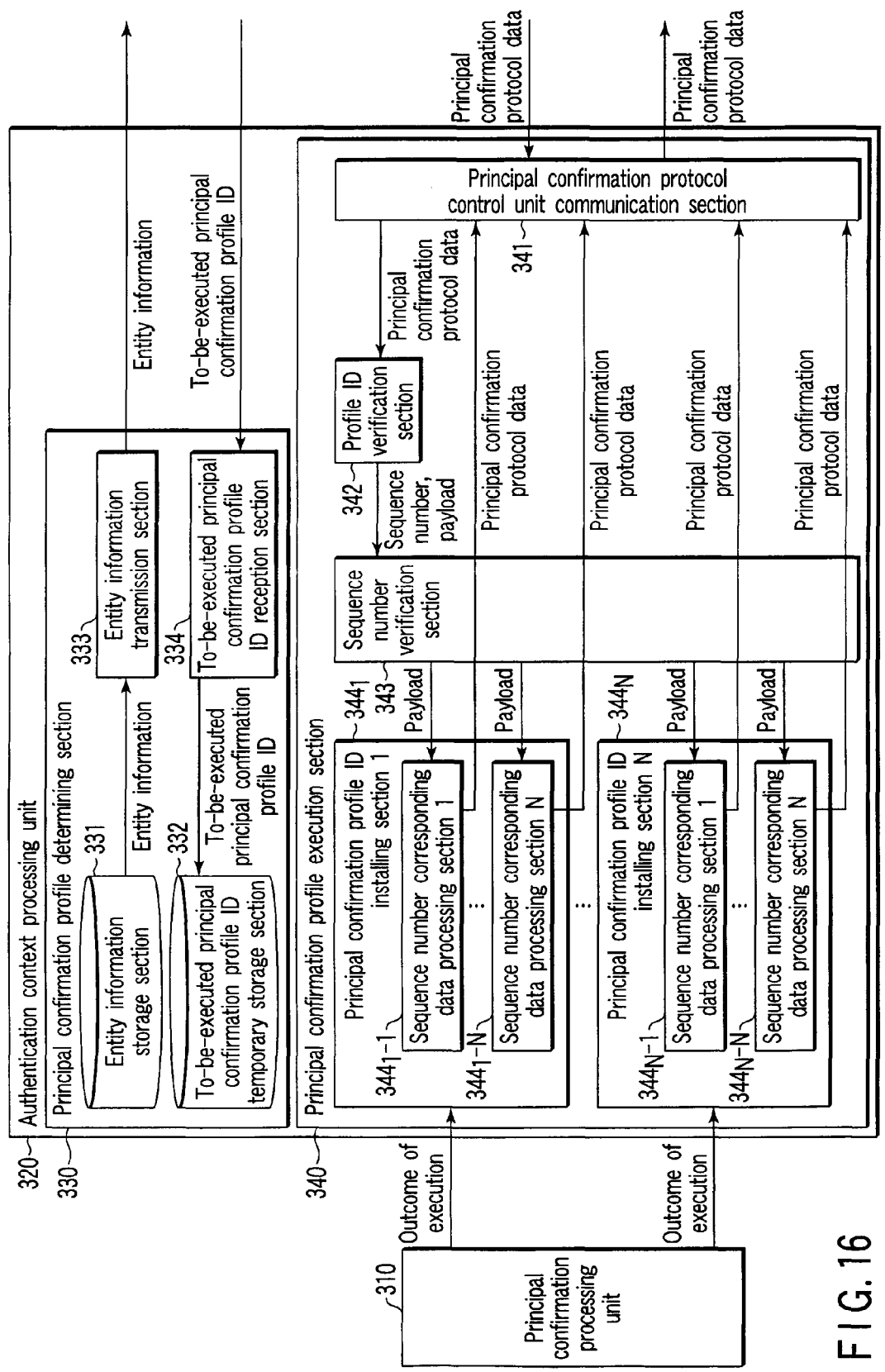
FIG. 16 is a schematic block diagram of the client side entity devices of the embodiment of FIG. 1, showing the configuration thereof.

As shown in FIG. 16, each client side entity device 300 includes a principal confirmation processing unit 310 and an authentication context processing unit 320.

Figure 17:
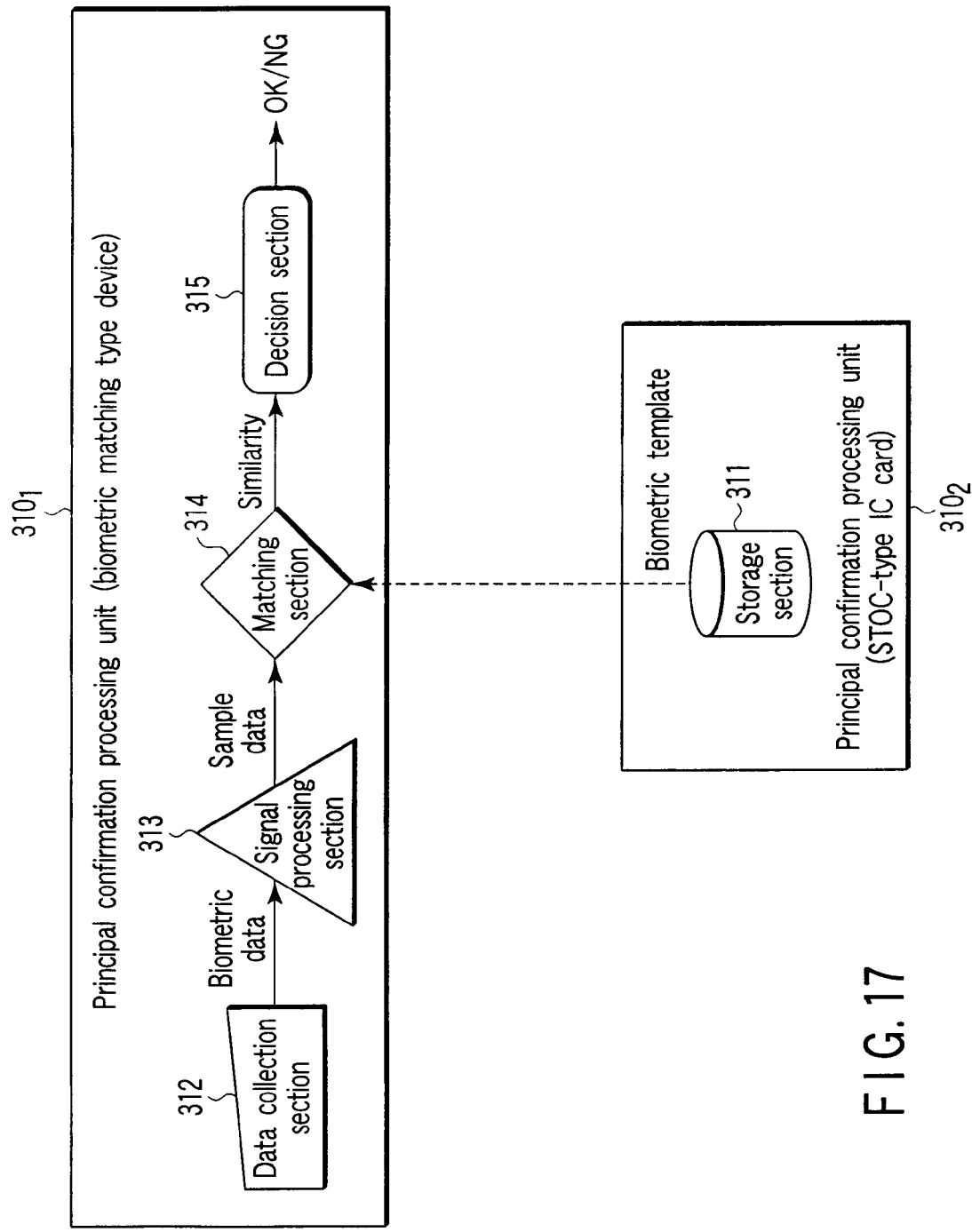
FIG. 17 is a schematic block diagram of the principal confirmation apparatus of the embodiment of FIG. 1, showing the configuration thereof.
Figure 20:
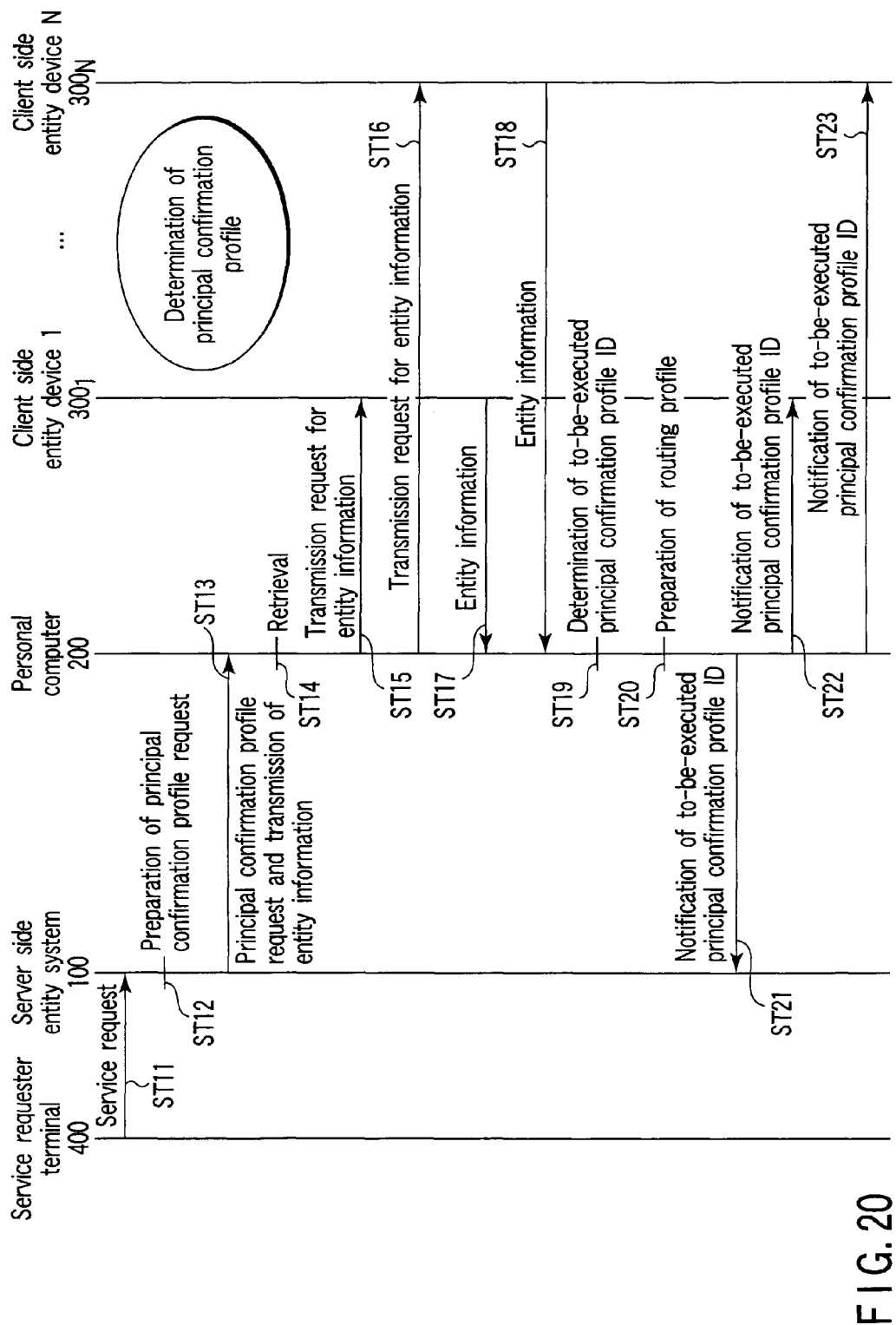
FIG. 20 is a schematic illustration of the sequence of a principal confirmation profile determining operation of the embodiment of FIG. 1.
Figure 21:
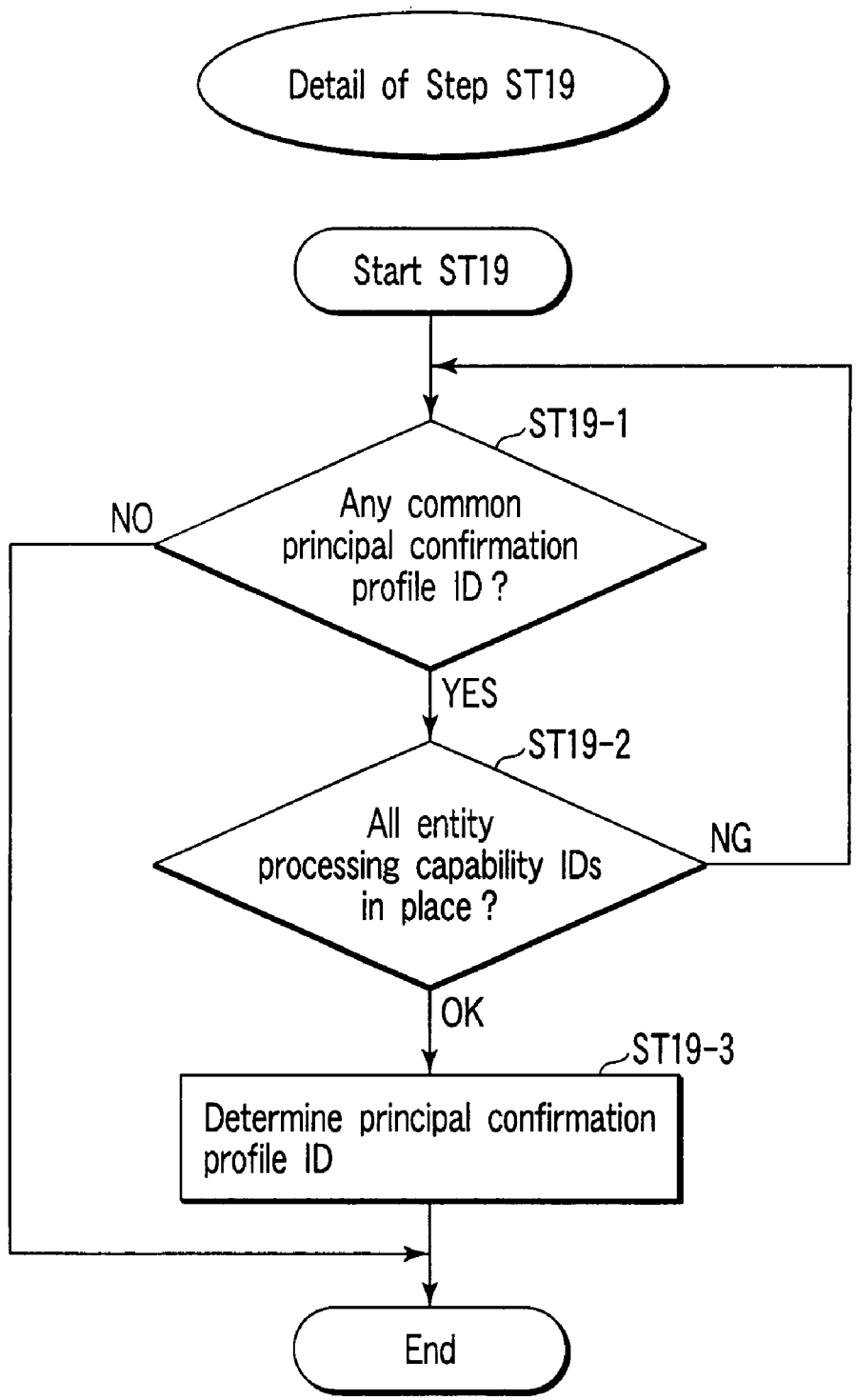
FIG. 21 is a flowchart of the principal confirmation profile ID determining process of the embodiment of FIG. 1.

The principal confirmation processing unit 310 executes a principal confirmation process for biometric authentication. The processing capability for the principal confirmation process for biometric authentication that the principal confirmation processing unit 310 is equipped with corresponds to the components 311 through 315 of the principal confirmation process for biometric authentication as shown in FIG. 17. The principal confirmation process for biometric authentication consists of five components including a storage section 311, a data collection section 312, a signal processing section 313, a matching section 314, a decision section 315. The principal confirmation processing unit 310 may be installed with all the components of the client side entity devices $300_1$ through $300_N$ and the server side entity systems $100_1$ through $100_N$ or alternatively with a part of the components.

In this embodiment, two of the client side entity devices $300_1$, $300_2$ are employed out of the client side entity devices $300_1$ through $300_N$ according to the determined principal confirmation profile IDs. The principal confirmation processing units $310_1$, $310_2$, which the two client side entity devices $300_1$, $300_2$ respectively have, possess different processing capabilities for the respective principal confirmation profile IDs.

For example, the first client side entity device $300_1$ is equipped with the processing capabilities of the data collection section 312, the signal processing section 313, the matching section 314 and the decision section 315 as processing capabilities of the principal confirmation processing unit $310_1$. Thus, it possesses the entity processing capability ID 291 on the entity processing capability ID definition table 29 as biometric matching type device $310_1$ (=0x0001).

The second client side entity device $300_2$ is equipped with the processing capability of the storage section 311 as the processing capability of the principal confirmation processing unit $310_2$. Thus, it posses the entity processing capability ID 292 on the entity processing capability ID definition table 29 as store-on-card (STOC) type IC card $310_2$ (=0x0002).

The authentication context processing unit 320 prepares the outcome of execution and the execution environment of a principal confirmation process of biometric authentication as context.

The authentication context processing unit 320 includes a principal confirmation profile determining section 330 and a principal confirmation protocol execution section 340.

The principal confirmation profile determining section 330 has a function of sending entity information in response to an entity information transmission request for the purpose of principal confirmation and that of storing the determined principal confirmation profile ID.

The principal confirmation profile determining section 330 includes an entity information storage section 331, a to-be-executed principal confirmation profile ID temporary storage section 332, an entity information transmission section 333 and a to-be-executed principal confirmation profile ID reception section 334.

The entity information storage section 331 stores entity information on the client side entity devices $300_1$ through $300_N$ themselves.

The to-be-executed principal confirmation profile ID temporary storage section 332 temporarily stores the to-be-executed principal confirmation profile ID determined by the principal confirmation profile determining section 223 in the principal confirmation protocol control unit 220.

The entity information transmission section 333 has a function of transmitting the entity information read out from the entity information storage section 331 to the principal confirmation profile determining section 223 in the principal confirmation protocol control unit 220 upon receiving an entity information transmission request from the personal computer apparatus 200.

The to-be-executed principal confirmation profile ID reception section 334 has a function of receiving the to-be-executed principal confirmation profile ID transmitted from the principal confirmation protocol control unit 220 and that of writing the to-be-executed principal confirmation profile ID into the to-be-executed principal confirmation profile ID temporary storage section 332.

The principal confirmation protocol execution section 340 communicates with the personal computer apparatus 200 and checks the principal confirmation profile ID, the sequence number and the payload contained in the principal confirmation protocol data in order to execute the principal confirmation protocol.

The principal confirmation protocol execution section 340 includes a principal confirmation protocol control unit communication section 341, a profile ID verification section 342, a sequence number verification section 343, principal confirmation profile ID equipped sections $344_1$ through $344_N$.

The principal confirmation protocol control unit communication section 341 receives principal confirmation protocol data from the device communication section 225 of the principal confirmation protocol control unit 220 on the personal computer apparatus 200 and transmits the outcome of the processes on the client side entity devices $300_1$ through $300_N$ as principal confirmation protocol data.

The profile ID verification section 342 verifies that the principal confirmation profile ID in the principal confirmation protocol data received at the principal confirmation protocol control unit communication section 341 is same and identical with the to-be-executed principal confirmation profile ID and takes out the sequence number and the payload from the principal confirmation protocol data.

The sequence number verification section 343 has a function of identifying the principal confirmation profile ID equipped section $344_i$ ($1 \leq i \leq N$) that agrees with the to-be-executed principal confirmation profile ID stored in the to-be-executed principal confirmation profile ID temporary storage section 332 and that of inputting the payload of the principal confirmation protocol data into the sequence number corresponding data processing sections $344_i$-1 through $344_i$-N that corresponds to the sequence number taken out from the profile ID verification section 332 for the identified principal confirmation profile ID equipped section $344_i$.

The principal confirmation profile ID equipped sections $344_1$ through $344_N$ are equipped respectively with sequence number corresponding data processing sections $334_1$-1 through $334_1$-N, . . . , $334_N$-1 through $334_N$-N that correspond to the sequence numbers defined in the corresponding communication protocol for each principal confirmation profile ID. The principal confirmation profile ID, the sequence numbers and the communication protocols are associated with each other and installed in the sequence number corresponding data processing sections $344_1$-1 through $344_1$-N, . . . , $344_N$-1 through $344_N$-N.

The sequence number corresponding data processing sections $344_1$-1 through $344_1$-N, . . . , $344_N$-1 through $344_N$-N have a function of preparing a principal confirmation protocol data according to the payload input from the sequence number verification section 342 and that of transmitting the prepared principal confirmation protocol data to the personal computer apparatus 200.

In the case where the payload is the payload section 60a of the principal confirmation start request message 40a, the sequence number corresponding data processing sections $344_1$-1 through $344_1$-N, . . . , $344_N$-1 through $344_N$-N have a function of preparing a template delivery (principal confirmation protocol 2) data 40b as shown in FIG. 18.

The template delivery data 40b is roughly divided into a header section 50b and a payload section 60b.

The header section 50b includes a destination of transmission entity processing capability ID 51b, an source of transmission entity processing capability ID 52b, a principal confirmation profile ID 53, a sequence number 54b and a payload length 55b. A biometric matching type device (0x0001) defined in the entity processing capability ID definition table 29 may typically be specified as the destination of transmission entity processing capability ID 51b. The STOC-type IC card (0x0002) may typically be specified as the source of transmission entity processing capability ID 52b. The determined to-be-executed principal confirmation profile ID is set as the principal confirmation profile ID 53. The sequence number determined by the principal confirmation protocol is set as the sequence number 54b. The data length of the payload section 60b is set as the payload length 55b.

The payload section 60b includes a challenge random number 61a, a template data length 62b, a template data 63b, a biometric authentication context data length 64b and the biometric authentication context 65b of an STOC-type IC card. The received challenge random number 61a is set as the challenge random number 61a. The data length of the template data of the service requester is set as the template data length 62b. The template data of the service requester is set as the template data 63b. The data length of the prepared biometric authentication context is set as the biometric authentication context data length 64b. The prepared biometric authentication context is set as the biometric authentication context 65b of the STOC-type IC card.

On the other hand, in the case where the payload is the payload section 60b of the template delivery data 40b, the sequence number corresponding data processing sections $344_1$-1 through $344_1$-N, . . . , $344_N$-1 through $344_N$-N have a function of preparing a biometric matching outcome delivery (principal confirmation protocol 3) data 40c as shown in FIG. 19.

The biometric matching outcome delivery data 40c is roughly divided into a header section 50c and a payload section 60c.

The header section 50c includes a destination of transmission entity processing capability ID 51c, a source of transmission entity processing capability ID 52c, a principal confirmation profile ID 53, a sequence number 54c, a payload length 55c. The service providing Web system (0x0003) defined in the entity processing capability ID definition table 29 may typically be specified as the destination of transmission entity processing capability ID 51c. The biometric matching device (0x0001) is specified as the source of transmission entity processing capability ID 52c. The determined to-be-executed principal confirmation profile ID is specified as the principal confirmation profile ID 53. The sequence number determined by the principal confirmation protocol is set as the sequence number 54c. The data length of the payload section 60c is set as the payload length 55c.

The payload section 60c includes a challenge random number 61a, the biometric authentication context data length 64b of an STOC-type IC card, the biometric authentication context 65b of the STOC-type IC card, the biometric authentication context data length 66c of a biometric matching device and the biometric authentication context data length 67c of the biometric matching device.

The received challenge random number 61a is set as the challenge random number 61a. The biometric authentication context data length 64b of the received STOC-type IC card is set as the biometric authentication context data length 64b of an STOC-type IC card. The biometric authentication context 65b of the received STOC-type IC card is set as the biometric authentication context 65b of the STOC-type IC card. The data length of the prepared biometric authentication context is set as the biometric authentication context data length 66c of a biometric matching device. The prepared biometric authentication context is set as the biometric authentication context data length 67c of the biometric matching device.

The service requester terminal 400 is a terminal apparatus for receiving a service from the server side entity system 100 as it is operated by the service requester. More specifically, it is a personal computer where a Web browser is installed.

Now, the operation of the authentication system having the above-described configuration will be described by referring to the sequence charts of FIGS. 20 through 24.

(Determination of Principal Confirmation Profile)

For the server side entity system $100_1$ to personally authenticate the service requester, the principal confirmation protocol control unit 220 mounted in the personal computer apparatus 200 the negotiates with an unspecified number of client side entity devices $300_1$ through $300_N$ connected to the personal computer apparatus 200 and determines an optimal combination of client side entity devices that satisfies the requirements of the principal confirmation process of the server side entity system.

[ST11] The service requester terminal 400 transmits a service request message to the server side entity system 100. At this time, the server side entity system 100 receives the service request message from the service requester terminal 400 by way of the http communication section 160.

[ST12] The server side entity system 100 reads out the principal confirmation profile request data 20 from the entity information storage section 131 by means of the entity information transmission section 133 according to the service request message.

[ST13] The entity information transmission section 133 reads out the own entity information 10 of the server side entity system 100 from the entity information storage section 131. Subsequently, the entity information transmission section 133 transmits the principal confirmation profile request data 20 and the entity information 10 read out to the personal computer apparatus 200.

The personal computer apparatus 200 receives the principal confirmation profile request data 20 and the entity information 10 by way of the http communication section 230.

[ST14] The personal computer apparatus 200 temporarily holds the principal confirmation profile request data 20 and the entity information 10 in the principal confirmation profile determining section 223. In the principal confirmation protocol control unit 220, the client side entity device retrieving section 222 retrieves the hardware management information storage section 210 and reads out the connection status list of the client side entity devices 300$_1$ through 300$_N$ that are connected to the personal computer apparatus 200 from the hardware management information storage section 210. The connection status list that is read out is then sent out from the client side entity device retrieving section 222 to the principal confirmation profile determining section 223.

[ST15] The principal confirmation profile determining section 223 transmits a transmission request for the entity information to the client side entity device 300$_1$ according to the connection status list. At this time, the principal confirmation profile determining section 223 directly accesses the entity information transmission section 333 of the client side entity device 300$_1$.

[ST16] The personal computer apparatus 200 transmits a transmission request for the entity information to the other client side entity devices 300$_2$ through 300$_N$ as in Step ST15.

[ST17] Upon receiving the transmission request for the entity information in Step ST15, the entity information transmission section 333 in the client side entity device 300$_1$ reads out the own entity information of the client side entity device 300$_1$ from the entity information storage section 331 and sends the entity information 10 to the principal confirmation profile determining section 223 of the personal computer apparatus 200.

[ST18] Similarly, upon receiving the transmission request for the entity information in Step ST16, the other client side entity devices 300$_2$ through 300$_N$ send the own entity information 10 of the client side entity devices 300$_2$ through 300$_N$ to the principal confirmation profile determining section 223.

[ST19] The principal confirmation profile determining section 223 collects the entity information of the client side entity devices 300$_1$ through 300$_N$ and determines the to-be-executed principal confirmation profile ID. Now, the process of determining the to-be-executed principal confirmation profile ID will be described below by referring to FIG. 21.

The process of determining the to-be-executed principal confirmation profile ID starts in a state where the principal confirmation profile determining section 223 acquires the entity information of the client side entity devices 300$_1$ through 300$_N$. If no client side entity device 300$_1$ through 300$_N$ is connected to the personal computer apparatus 200 and no entity information can be acquired, the process of determining the to-be-executed principal confirmation profile ID is immediately ended.

[ST19-1] The principal confirmation profile determining section 223 takes out the principal confirmation profile IDs 24 sequentially starting from the principal confirmation profile ID request information 23' having the highest request priority 26 in the principal confirmation profile ID request information list 23 for the principal confirmation profile request 20.

The principal confirmation profile determining section 223 takes out the principal confirmation profile ID 15 from the principal confirmation profile information 14' in the principal confirmation profile information list 14 in the entity information 10 acquired from the client side entity devices 300$_1$ through 300$_N$ and the server side entity system 100.

The principal confirmation profile determining section 223 retrieves the principal confirmation profile ID 15 taken out from the entity information 10, using the principal confirmation profile ID 24 taken out from the principal confirmation profile requests 20 as retrieval ID.

When the principal confirmation profile ID 24 and the principal confirmation profile ID 15 agree with each other, the entity ID 11 of the entity information 10 that contains the agreeing principal confirmation profile ID 15 is temporarily stored. If they do not agree with each other, the principal confirmation profile determining section 223 retrieves the principal confirmation profile ID 15 of the entity information 10, using the principal confirmation profile ID 24 having the next highest request priority 26 in the principal confirmation profile ID request information 23' as retrieval ID.

The retrieving process is repeated for the number 22 of the principal confirmation profile ID requests 20 and, if there is not any agreeing principal confirmation profile ID 15, the process of determining the to-be-executed principal confirmation profile ID is immediately ended.

[ST19-2] The principal confirmation profile determining section 223 takes out the entity processing capability ID 17 of the principal confirmation profile information 14' that contains the principal confirmation profile ID 15 agreeing with the retrieval ID with regard to the entity information 10 including the principal confirmation profile ID that is found to be agreeing in Step ST19-1.

The principal confirmation profile determining section 223 confirms that the entity processing capability ID 17 it takes out is same and identical with the entity processing capability ID in the entity processing capability list 28 for the principal confirmation profile ID request information 23'. It performs a same confirming operation for the entity ID of each of the remaining client side entity devices 300.

After the above confirming operations, it is confirmed that the plurality of agreeing entity processing capability IDs 29 are all there corresponding to the entity processing capability IDs in the entity processing capability ID list 28 for the principal confirmation profile ID request information 23' without duplication.

[ST19-3] When it is confirmed that the plurality of agreeing entity processing capability IDs 29 are all there without duplication as a result of the processing operation of Step ST19-2, the principal confirmation profile IDs 15 that are found to be agreeing as a result of the retrieval are determined to be principal confirmation profile IDs to be executed thereafter to end the processing operation of Step ST19. If it is not confirmed that the plurality of agreeing entity processing capability IDs 29 are not all there, the processing operation returns to Step ST19-1.

[ST20] The principal confirmation profile determining section 223 prepares a routing table 30, associating the entity IDs 10 of the client side entity devices 300$_1$ through 300$_N$ and the server side entity system 100 that correspond to the principal confirmation profile IDs 15 acquired in Step ST19 and the respective entity processing capability IDs 17.

[ST21] The principal confirmation profile determining section 223 transmits the to-be-executed principal confirmation profile IDs 15 determined in Step ST19 to the server side entity system 100 by way of the http communication section 230. At the same time, the server side entity system 100 receives the to-be-executed principal confirmation profile IDs 15 by way of the http communication section 160. The received to-be-executed principal confirmation file IDs 15 are temporarily stored in the to-be-executed principal confirmation profile ID temporary storage section 132 by the to-be-executed principal confirmation profile ID reception section 134 of the authentication context processing unit 120.

[ST22] When the client side entity device $300_1$ is an entity that corresponds to one of the to-be-executed principal confirmation profile IDs 15, the principal confirmation profile determining section 223 transmits the to-be-executed principal confirmation profile IDs 15 determined in Step ST19 to the client side entity device $300_1$ by way of the http communication section 230.

At the same time, the client side entity device $300_1$ acquires the to-be-executed principal confirmation profile IDs by means of the to-be-executed principal confirmation profile ID reception section 334 of the principal confirmation profile determining section 330 and stores them in the to-be-executed principal confirmation profile ID temporary storage section 332.

When, on the other hand, the client side entity device $300_1$ is not an entity that corresponds to one of the to-be-executed principal confirmation profile IDs, the principal confirmation profile determining section 223 does not transmit anything to the client side entity device $300_1$.

[ST23] The principal confirmation profile determining section 223 performs a processing operation similar to that of Step ST22 for each of the other client side entity devices $300_2$ through $300_N$.

As a result of the above-described sequence, it is possible to determine the to-be-executed principal confirmation profile IDs that show a combination of client side entity devices $300_1$ through $300_N$ according to the principal confirmation protocol that the server side entity system 100 requires.

(Principal Confirmation/Provision of Service)

Now, the operation of executing a principal confirmation process and providing a service on an open network according to the determined to-be-executed principal confirmation profile IDs will be described below. The following description also applies to the operation of the principal confirmation protocol control unit 220 of handling the message defined by the communication protocol of the principal confirmation process for the client side entity devices $300_1$ through $300_N$ and the server side entity systems $100_1$ through $100_N$.

[Summary of Operation Sequence]

To begin with, assume that one of the server side entity systems $100_1$ through $100_N$ receives a service request from the service requester terminal 400.

Figure 22:
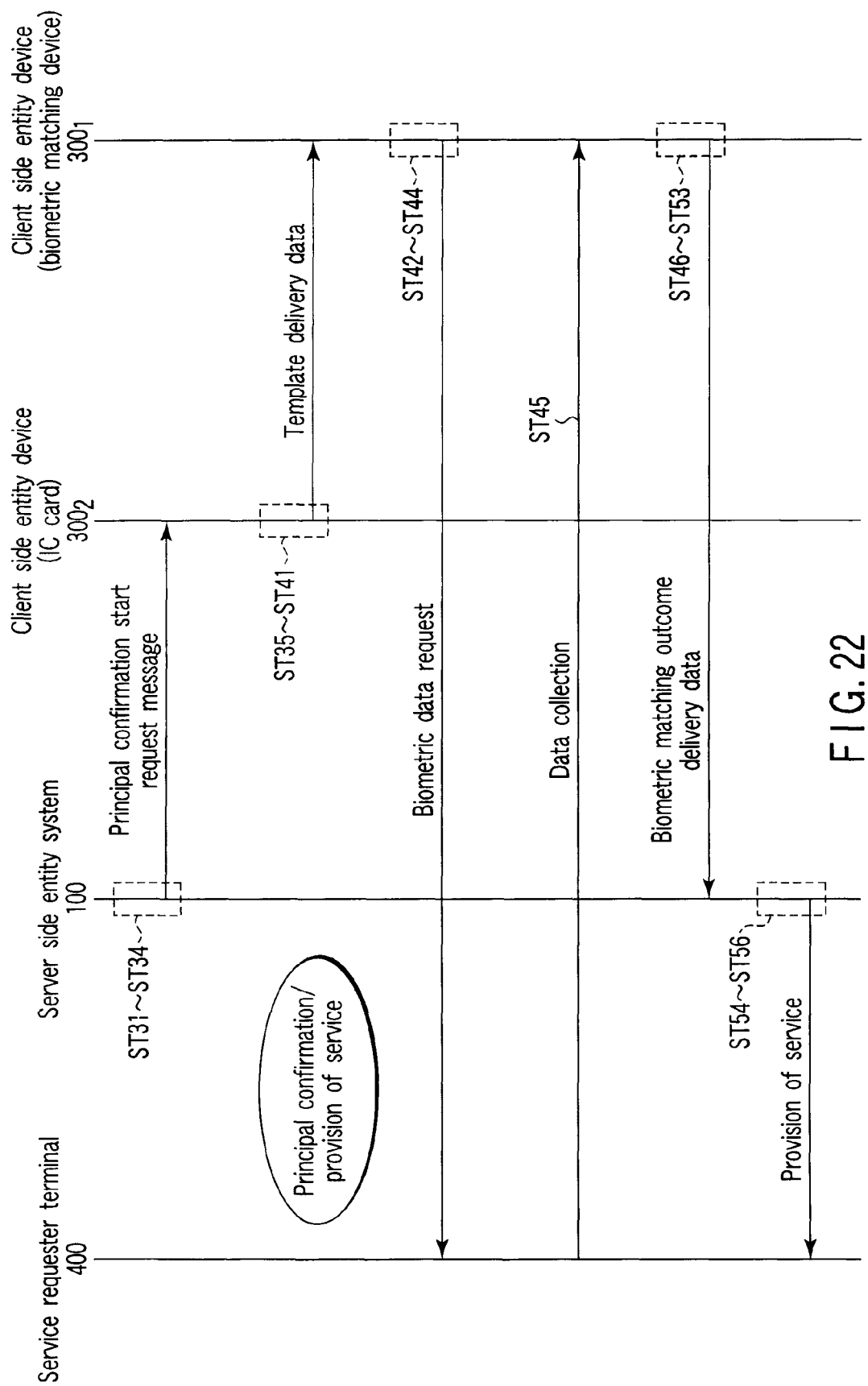
FIG. 22 is a schematic illustration of the communication sequence for principal confirmation of the embodiment of FIG. 1.

[ST31 through ST34] As shown in FIG. 22, the server side entity system 100 transmits a principal confirmation start request message (principal confirmation protocol 1) to the client side entity device (IC card) $300_2$.

[ST35 through ST41] Upon receiving the principal confirmation start request message, the client side entity device (IC card) $300_2$ generates a template delivery data (principal confirmation protocol 2) according to the template data stored in the IC card and the generated biometric authentication context and transmits the template delivery data to the client side entity device (biometric matching device) $300_1$.

[ST42 through ST44] Upon receiving the template delivery data, the client side entity device (biometric matching device) $300_1$ transmits a biometric data request to the service requester terminal 400.

[ST45] The service requester terminal 400 displays the received biometric data request. As a result, the client side entity device $300_1$ collects biometric data from the service requester according to the operation of the service requester.

[ST46 through ST53] The client side entity device $300_1$ executes a biometric data matching process (biometric matching) according to the collected biometric data. The results and the execution environment of the biometric matching are contained in the generated biometric authentication context.

After the generation of the biometric authentication context, the client side entity device $300_1$ generates biometric matching outcome delivery data (principal confirmation protocol 3) according to the biometric authentication context generated by itself and the biometric authentication context generated by the client side entity device (IC card) $300_2$ and transmits the obtained biometric matching outcome delivery data to the server side entity system 100.

[ST54 through ST56] The server side entity system 100 verifies the biometric authentication contexts contained in the received biometric matching outcome delivery data and generated by the client side entity devices $300_1$, $300_2$. When the outcome of the verification is a proper one, it provides the service to the service requester by way of the service requester terminal 400.

[Detailed Sequence]

Figure 23:
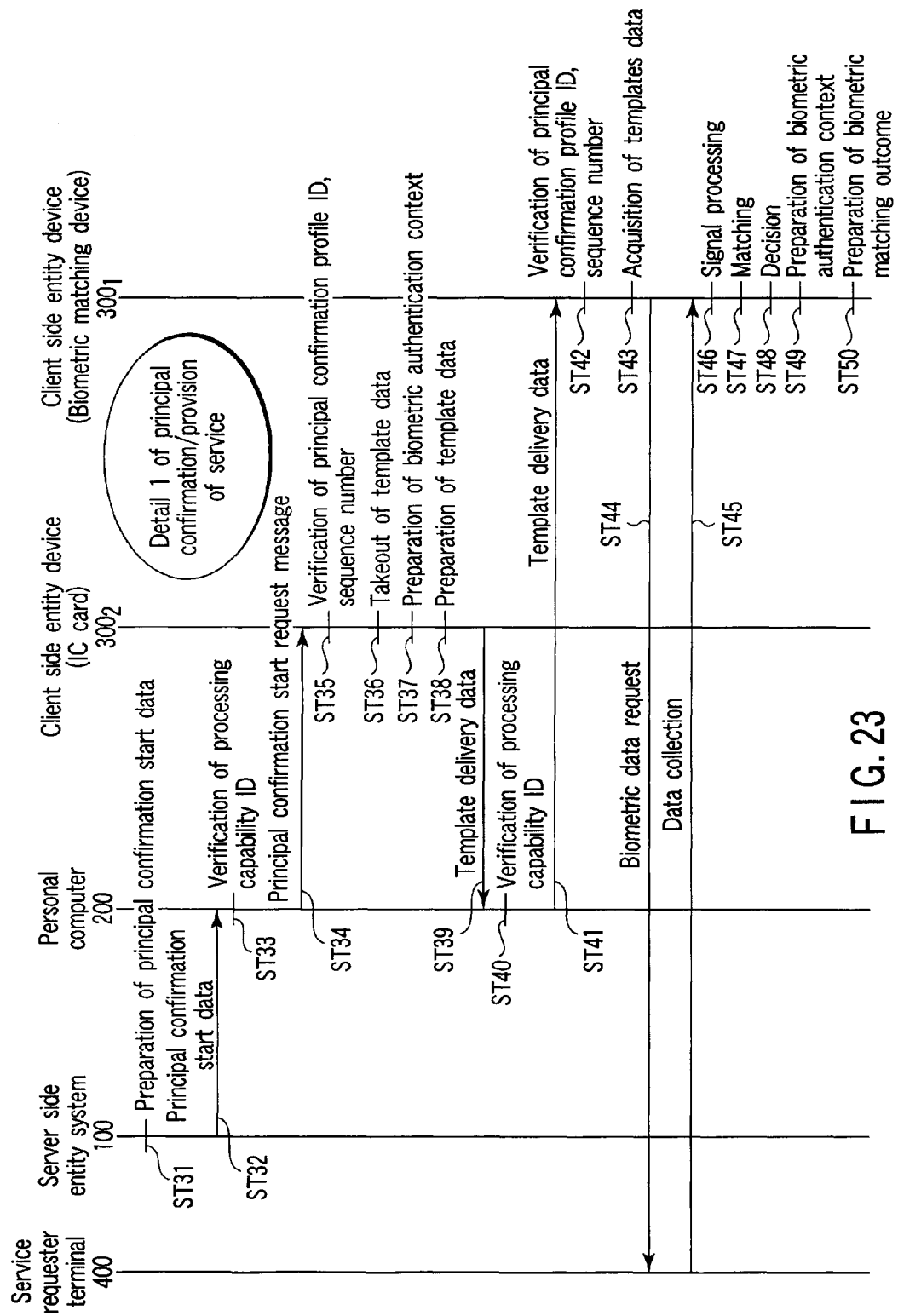
FIG. 23 is a schematic illustration of the sequence of an operation down to collection of data on the principal confirmation protocol.

[ST31] As shown in FIG. 23, the server side entity system 100 prepares a principal confirmation start request message (principal confirmation protocol 1) 40a as shown in FIG. 12 by means of the sequence number corresponding data processing section $143_1$-1 in the principal confirmation profile ID installing section $143_1$, which corresponds to the to-be-executed principal confirmation profile ID in the to-be-executed principal confirmation profile ID temporary storage section 132.

[ST32] The server side entity system 100 transmits the prepared principal confirmation start request message 40a to the personal computer apparatus 200 by way of the http communication section 160.

[ST33] The personal computer apparatus 200 receives the principal confirmation start request message 40a at the http communication section 230. The principal confirmation protocol routing execution section 224 reads out the destination of transmission entity processing capability ID 51a from the principal confirmation start request message 40a. The principal confirmation protocol routing execution section 224 then reads out the entity ID 292 (=0x12ef) that corresponds to the destination of transmission entity processing capability ID (=0x0002) from the routing table 30 in the routing table temporary storage section 221 according to the destination of transmission entity processing capability ID (=0x0002).

[ST34] The personal computer apparatus 200 transfers the principal confirmation start request message 40a to the client side entity device (IC card) $300_2$, which corresponds to the destination of transmission entity ID 292, by way of the apparatus communication section 225.

[ST35] The client side entity device (IC card) $300_2$ receives the principal confirmation start request message 40a by way of the principal confirmation protocol control unit communication section 341. After receiving the message, the profile ID verification section 342 identifies the principal confirmation profile ID installing section $344_2$ to be used out of the principal confirmation profile ID installing sections $344_1$ through $344_N$ according to the principal confirmation profile ID 53 in the principal confirmation start request message 40*a*.

After the identification of the principal confirmation profile ID installing section $344_2$, the sequence number verification section 343 identifies the sequence number corresponding data processing section $344_2$-2 out of the sequence number corresponding data processing sections $344_2$-1 through $344_2$-N according to the sequence number 54*a* in the principal confirmation start request message 40*a*.

After the identification of the sequence number corresponding data processing section $344_2$-2, the sequence number verification section 343 inputs the payload section 60*a* (challenge random number 61*a*) of the principal confirmation start request message 40*a* to the identified sequence number corresponding data processing section $344_2$-2. As a result, the sequence number corresponding data processing section $344_2$-2 starts a sequence number corresponding data process.

[ST36] Upon receiving the challenge random number 61*a*, the sequence number corresponding data processing section $344_2$-2 reads out the template data of the service requester from the storage section 311 in the principal confirmation processing unit $310_2$.

[ST37] The sequence number corresponding data processing section $344_2$-2 prepares a biometric authentication context according to the template. The biometric authentication context includes the serial number of the open key certificate of the service requester, the challenge random number 61*a* of the principal confirmation start request message 40*a*, the hash value of the template data and the data on the digital signature prepared by means of the private key of the service requester for them.

[ST38] The sequence number corresponding data processing section $344_2$-2 prepares template delivery (principal confirmation protocol 2) data 40*b* as shown in FIG. 18 according to the principal confirmation protocol of the principal confirmation profile ID 53.

[ST39] Subsequently, the client side entity device (IC card) 300$_2$ transmits the template delivery data 40*b* to the personal computer apparatus 200 by way of the principal confirmation protocol control unit communication section 341.

[ST40] The personal computer apparatus 200 receives the template delivery data 40*b* at the http communication section 230 as in Step ST33. The template delivery data 40*b* is then input to the principal confirmation protocol routing execution section 224. The principal confirmation protocol routing execution section 224 reads out the destination of transmission entity processing capability ID 51*b* from the template delivery data 40*b*.

The principal confirmation protocol routing execution section 224 reads out the entity ID11-310$_1$ (=0x3a29) that corresponds to the destination of transmission entity processing capability ID (0x0001) 51*b* from the routing table 30 in the routing table temporary storage section 221 according to the destination of transmission processing capability ID 51*b*.

[ST41] The personal computer apparatus 200 transfers the temperature delivery data 40*b* to the client side entity device (biometric matching device) 300$_1$ by means of the apparatus communication section 225 according to the destination of transmission entity ID 51*b* as in Step ST34.

[ST42] The client side entity device (biometric matching device) 300$_1$ receives the template delivery data 40*b* by means of the principal confirmation protocol control unit communication section 341 as in Step ST35. After the reception, the profile ID verification section 342 identifies the principal confirmation profile ID installing section $344_1$ to be used out of the principal confirmation profile ID installing sections $344_1$ through $344_N$ according to the principal confirmation profile ID 53 in the template delivery data 40*b*.

After the identification, the sequence number verification section 343 identifies the sequence number corresponding data processing section $344_1$-1 to be used out of the sequence number corresponding data processing sections $344_1$-1 through $344_1$-N in the identified principal confirmation profile ID installing section $344_1$ according to the sequence number 54*b* in the template delivery data 40*b*.

After the latter identification, the sequence number verification section 343 inputs the payload section (challenge random number 61*a*, the template data length 62*b*, the template data 63*b*, the template data length of the STOC-type IC card 64*b* and the biometric authentication context of the STOC-type IC card 65*b*) 60*b* in the template delivery data 40*b* into the identified sequence number corresponding data processing section $344_1$-1. As a result, the sequence number corresponding data processing section $344_1$-1 starts a sequence number corresponding data process.

[ST43] The sequence number corresponding data processing section $344_1$ reads out the temperature data 63*b* from the template delivery data 40*b*.

[ST44] Subsequently, the client side entity device (biometric matching device) 300$_1$ notifies the service requester terminal 400 of the biometric data request from the sequence number corresponding data processing section $344_1$ by way of the principal confirmation processing unit 310$_1$.

[ST45] The service requester terminal 400 displays the notified biometric data request. The principal confirmation processing unit 310$_1$ of the client side entity device (biometric matching device) 300$_1$ collects the biometric data of the service requester from the data collection section 312 according to the operation of the service requester.

[ST46] In the principal confirmation processing unit 310$_1$, the signal processing section 313 processes the signals of the collected biometric data to generate a sample data.

[ST47] In the principal confirmation processing unit 310$_1$, the matching section 314 collates the generated sample data and the template data read out in Step ST43 to see the similarity.

[ST48] In the client side entity device (biometric matching section) 300$_1$, the decision section 315 decides the obtained similarity and executes a principal confirmation process. The outcome of the principal confirmation is notified to the sequence number corresponding data processing section $344_1$ from the principal confirmation processing unit 310$_1$. Assume that the principal confirmation process is successfully completed.

[ST49] As a result, the sequence number corresponding data processing section $344_1$-1 prepares a biometric authentication context. The prepared biometric authentication context includes the serial number of the open key certificate of the client side entity device (biometric matching device) 300$_1$, the challenge random number 61*a* in the principal confirmation start requester message 40*a*, the hash value of the template data obtained in Step ST43, the similarity obtained in Step ST47, the outcome of the principal confirmation obtained in Step ST48, the collation level of the execution of Step ST47 and the data of the digital signature prepared by the private key of the client side entity device (biometric matching device) 300$_1$ for the preceding pieces of information.

[ST50] The sequence number corresponding data processing section $344_1$-1 prepares a biometric matching outcome delivery data 40c according to the principal confirmation protocol of the principal confirmation profile ID.

[ST51] As shown in FIG. 24, the client side entity device (biometric matching device) $300_1$ transmits the biometric matching outcome delivery data 40c to the personal computer apparatus 200 by way of the principal confirmation protocol control unit communication section 341.

[ST52] The personal computer apparatus 200 receives the biometric matching outcome delivery data 40c by way of the http communication section 230. The received biometric matching outcome delivery data 40c is input to the principal confirmation protocol routing execution section 224. The principal confirmation protocol routing execution section 224 reads out the destination of transmission entity processing capability ID 51c from the biometric matching outcome delivery data 40c.

Then, the principal confirmation protocol routing execution section 224 reads out the entity ID 11-100 (=0xba7c) that corresponds to the destination of transmission entity processing capability ID (=0x0003) from the routing table 30 in the routing table temporary storage section 221 according to the destination of transmission entity processing capability ID (=0x0003).

[ST53] The personal computer apparatus 200 transfers the biometric matching outcome delivery data 40c to the server side entity system 100 that corresponds to the destination of transmission entity ID 11-100 by means of the http communication section 230.

[ST54] The server side entity system 100 receives the biometric matching outcome delivery data 40c by way of the http communication section 160. After the reception, the profile ID verification section 141 identifies the principal confirmation profile ID installing section $143_1$ to be used out of the principal confirmation profile ID installing sections $143_1$ through $143_N$ according to the principal confirmation profile ID 53 in the biometric matching outcome delivery data 40c.

After the identification, the sequence number verification section 142 identifies the sequence number corresponding data processing section $143_1$-1 to be used out of the sequence number corresponding data processing sections $143_1$-1 through $143_1$-N according to the sequence number 54c in the biometric matching outcome delivery data 40c.

After the latter identification, the sequence number verification section 142 inputs the payload section (challenge random number 61a, the biometric authentication context data length of the STOC-type IC card 64b, the biometric authentication context of the STOC-type IC card 65b, the biometric authentication context data length of the biometric matching type device 66c and the biometric authentication context 67 of the biometric matching type device) 60c of the biometric matching outcome delivery data 40c into the identified sequence number corresponding data processing section $143_1$-1. As a result, the sequence number corresponding data processing section $143_1$-1 starts processing the sequence number corresponding data.

[ST55] The sequence number corresponding data processing section $143_1$-1 verifies the biometric authentication context for the principal confirmation according to the open key certificate of the service requester terminal 400, the open key certificate of the client side entity device $300_1$ (biometric matching device) and the received biometric matching outcome delivery data 40c.

[ST56] When the outcome of the verification of the biometric authentication context is affirmative, the server side entity system 100 provides the service requester with a service from the server providing/processing unit 150 by way of the service requester terminal 400.

As described above in detail, with this embodiment, the ID request information that includes the request priority is stored for each requested service and, upon receiving (server side) entity information 10 and principal confirmation profile ID request information from the server side entity system 100, the personal computer apparatus 200 transmits an entity information transmission request to each of the client side entity devices $300_1$ through $300_N$ and receives (client side) entity information 10 from each of the client side entity devices.

Thus, as a result, the personal computer apparatus 200 determines the principal confirmation profile ID in the client side entity information and the principal confirmation profile ID in the server side entity information according to the principal confirmation profile ID request information having the highest priority in the ID request information out of the pieces of principal confirmation profile ID request information in the ID request information.

Therefore, it is possible to determine a combination of entity devices according to the request priority even when there are a plurality of entity devices that are equipped with a combination of a plurality of processing capabilities.

Additionally, the personal computer apparatus 200 prepares and stores a routing table 30 where the processing capability IDs corresponding to the principal confirmation profile IDs and the entity IDs are associated with each other according to the determined principal confirmation profile IDs.

Thereafter, upon receiving communication messages 40a through 40c that include the processing capability ID indicating the destination of transmission and the processing capability ID indicating the source of transmission from the client side entity devices $300_1$, $300_2$ or the server side entity system 100, the personal computer apparatus 200 transfers the communication messages to the entity devices $300_1$, $300_2$ or 100 having the entity ID that corresponds to the processing capability ID indicating the destination of transmission according to the routing table 30.

In this way, it is possible to handle (transfer) communication messages among a plurality of entity devices that are equipped with a combination of a plurality of processing capabilities according to the routing table.

Additionally, this embodiment can be applied not only to authentication systems using biometric authentication contexts but also to authentication systems using authentication contexts realized by other means to provide similar advantages.

The technique described above for the embodiment can be stored as a program to be executed by a computer in memory mediums including magnetic disks (floppy™ disks, hard disks, etc.), optical disks (CD-ROMs, DVDs, etc.), magneto-optical disks (MOs) and semiconductor memories for distribution.

Memory mediums that can be used for the purpose of the present invention are not limited to those listed above and memory mediums of any type can also be used for the purpose of the present invention so long as they are computer-readable ones.

Additionally, the OS (operating system) operating on a computer according to the instructions of a program installed in the computer from a memory medium, data base management software and/or middleware such as network software may take part in each of the processes for realizing the above embodiment.

Still additionally, memory mediums that can be used for the purpose of the present invention are not limited to those independent from computers but include memory mediums adapted to download a program transmitted by LANs and/or the Internet and permanently or temporarily store it.

It is not necessary that a single memory medium is used with the above described embodiment. In other words, a plurality of memory mediums may be used with the above-described embodiment to execute any of the above described various processes. Such memory mediums may have any configuration.

For the purpose of the present invention, a computer executes various processes according to one or more than one programs stored in the memory medium or mediums as described above for the preferred embodiment. More specifically, the computer may be a stand alone computer or a system realized by connecting a plurality of computers by way of a network.

For the purpose of the present invention, computers include not only personal computers but also processors and microcomputers contained in information processing apparatus. In other words, computers generally refer to apparatus and appliances that can realize the functional features of the present invention by means of a computer program.

The present invention is by no means limited to the above described embodiment, which may be modified in various different ways without departing from the spirit and scope of the invention. Additionally, any of the components of the above described embodiment may be combined differently in various appropriate ways for the purpose of the present invention. For example, some of the components of the above described embodiment may be omitted. Alternatively, components of different embodiments may be combined appropriately in various different ways for the purpose of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An authentication system comprising:
a plurality of client side entity devices to be used for principal confirmation processes utilizing biometric authentication;
a server side entity device capable of providing a service to a service requester terminal of a service requester confirmed by the principal confirmation process; and
a consolidation apparatus for mediating communications between each of the client side entity devices and the server side entity device,
each of the client side entity devices including:
principal confirmation process devices configured to be able to execute a plurality of principal confirmation processes;
a client side memory device that stores client side entity information including an entity ID of the client side entity device and a plurality of pieces of principal confirmation profile information, each including a principal confirmation profile ID indicating a principal confirmation process of the principal confirmation process device and a processing capability ID indicating the processing capability for the principal confirmation process, the entity ID of the client side entity device being a unique ID assigned to each of the client side entity devices, the processing capability of the client side entity device indicating a combination of data collection, signal processing, storage, matching, and decision;
a device configured to transmit the client side entity information to the consolidation apparatus upon receiving an entity information transmission request; and
authentication context generation devices for generating a biometric authentication context including the outcome of execution of a principal confirmation process by the principal confirmation process device;
the server side entity device including:
authentication context verification devices for verifying the biometric authentication context;
service providing/processing devices configured to provide a service to the service requester terminal of the confirmed service requester when the outcome of the verification indicates properness of the request;
a server side first memory device that stores server side entity information including an entity ID of the server side entity device and a plurality of pieces of principal confirmation profile information, each including a principal confirmation profile ID indicating a principal confirmation process of the authentication context verification device and a processing capability ID indicating the processing capability for the principal confirmation process, the entity ID of the server side entity device being a unique ID assigned to the server side entity device, the processing capability of the server side entity device indicating a context verification;
a server side second memory device that stores principal confirmation profile request data having a plurality of pieces of principal confirmation profile ID request information, each including a principal confirmation profile ID, a request priority and a plurality of processing capability IDs for each requested service; and
a device configured to transmit the server side entity information and the principal confirmation profile request data to the consolidation apparatus upon receiving a service request;
the consolidation apparatus including:
a device configured to transmit the entity information transmission request to each client side entity device upon receiving the server side entity information and the principal confirmation profile request data from the server side entity device;
a device configured to receive client side entity information from each client side entity device in response to the transmission of the entity information transmission request;
a profile ID determination device configured to determine the principal confirmation profile ID in the principal confirmation profile ID of each of the pieces of client side entity information and the principal confirmation profile ID in the server side entity information according to the principal confirmation profile ID request information showing a higher priority in the principal confirmation profile request data out of the pieces of principal confirmation profile ID request information in the principal confirmation profile request data;
a routing table preparation device configured to prepare routing table information associating the processing capability ID and the entity ID corresponding to the principal confirmation profile ID with each other according to the determined principal confirmation profile ID;
a routing table memory device that stores the routing table information; and
a message transfer device configured to transfer a communication message to the entity device having the entity ID corresponding to the processing capability ID showing the destination of transmission according to the routing table information stored in the routing table memory device upon receiving the communication message including a processing capability ID showing the destination of transmission and a processing capability ID showing the source of transmission from a client side entity device or the server side entity device.

2. A consolidation apparatus for mediating communications between a plurality of client side entity devices to be used in a principal confirmation process for biometric authentication and a server side entity device capable of providing a service to the service requester terminal of a service requester confirmed by means of a principal confirmation process, the apparatus comprising:
a device configured to transmit an entity information transmission request to each client side entity device upon receiving server side entity information including an entity ID of the server side entity device and a plurality of pieces of principal confirmation profile information, each including a principal confirmation profile ID showing the principal confirmation process and a processing capability ID showing the processing capability in the principal confirmation process, the entity ID of the server side entity device being a unique ID assigned to the server side entity device, the processing capability of the server side entity device indicating a context verification and principal confirmation profile request data including a principal confirmation profile ID and a plurality of pieces of principal confirmation profile ID request information, each including a request priority and a plurality of processing capability IDs, for each requested service from the server side entity device;
a device configured to receive client side entity information including an entity ID of the client side entity device and a plurality of pieces of principal confirmation profile information, each including a principal confirmation profile ID showing the principal confirmation process and a processing capability ID showing the processing capability in the principal confirmation process, the entity ID of the client side entity device being a unique ID assigned to each of the client side entity devices, the processing capability of the client side entity device indicating a combination of data collection, signal processing, storage, matching, and decision from each of the client side entity devices according to the transmission of the entity information transmission request;
a profile ID determination device configured to determine the principal confirmation profile ID in each piece of client side entity information and the principal confirmation profile ID in the server side entity information according to the principal confirmation profile ID request information having the highest priority in the principal confirmation profile request data out of the principal confirmation profile ID request information in the principal confirmation profile request data;
a routing table preparation device configured to prepare a routing table information associating the processing capability IDs and the entity IDs with each other to correspond to the principal confirmation profile ID according to the determined principal confirmation profile ID; and
a routing table memory device that stores the routing table information.

3. The apparatus according to claim 2, further comprising:
a message transfer device configured to transfer a communication message to the entity device having the entity ID corresponding to the processing capability ID indicating the destination of transmission according to the routing table information in the routing table memory device upon receiving the communication message containing the processing capability ID indicating the destination of transmission and the processing capability ID indicating the source of transmission from a client side entity device or a server side entity device.

4. A server side entity device capable of communicating with a plurality of client side entity devices to be used in a principal confirmation process for biometric authentication by the consolidation apparatus of claim 2 and providing a service to the service requester terminal of the service requester confirmed by the principal confirmation process, the server side entity device comprising:
an authentication context verification device for verifying the biometric authentication context including the outcome of execution of the principal confirmation process;
a service providing/processing device configured to provide a service to the service requester terminal of the personally authenticated service requester when the outcome of verification indicates properness of the request;
a server side first memory device that stores server side entity information including a plurality of pieces of principal confirmation profile information, each including a principal confirmation profile ID indicating a principal confirmation process of the authentication context verification device and a processing capability ID indicating the processing capability for the principal confirmation process, the processing capability of the server side entity device indicating a context verification;
a server side second memory device that stores principal confirmation profile request data including a plurality of pieces of principal confirmation profile ID request information, each including a principal confirmation profile ID, a request priority and a plurality of processing capability IDs for each requested service; and
a device configured to transmit the server side entity information and the principal confirmation profile request data to the consolidation apparatus upon receiving a service request.

5. A non-transitory computer-readable storage medium storing computer executable code executed by a processor of a consolidation apparatus for mediating communications between a plurality of client side entity devices to be used in a principal confirmation process for biometric authentication and a server side entity device capable of providing a service to the service requester terminal of a service requester confirmed by a principal confirmation process, the computer executable code comprising:
a first code for causing the processor to execute a process of transmitting an entity information transmission request to each client side entity device upon receiving server side entity information including a plurality of pieces of principal confirmation profile information, each including a principal confirmation profile ID showing the principal confirmation process and a processing capability ID showing the processing capability in the principal confirmation process for each entity ID of the server side entity device, the processing capability of the server side entity device indicating a context verification and principal confirmation profile request data including a principal confirmation profile ID and a plurality of pieces of principal confirmation ID request information, each including a request priority and a plurality of processing capability IDs, for each requested service from the server side entity device;

a second code for causing the processor to execute a process of receiving client side entity information including a plurality of pieces of principal confirmation profile information, each including a principal confirmation profile ID showing the principal confirmation process and a processing capability ID showing the processing capability in the principal confirmation process for each entity ID of each client side entity device, the processing capability of the client side entity device indicating a combination of data collection, signal processing, storage, matching, and decision from each client side entity device according to transmission of the entity information transmission request;

a third code for causing the processor to execute a process of determining the principal confirmation profile ID in each piece of client side entity information and the principal confirmation profile ID in the server side entity information according to the principal confirmation profile ID request information having the highest priority in the principal confirmation profile request data out of the principal confirmation profile ID request information in the principal confirmation profile request data;

a fourth code for causing the processor to execute a process of preparing a routing table information associating the processing capability IDs and the entity IDs with each other to correspond to the principal confirmation profile ID according to the determined principal confirmation profile ID; and a fifth code for causing the processor to execute a process of writing the routing table information to a memory of the consolidation apparatus.

6. The non-transitory computer-readable storage medium according to claim 5, the computer executable code further comprising:

a sixth code for causing the processor to execute a process of transferring a communication message to the entity device having the entity ID corresponding to the processing capability ID indicating the destination of transmission according to the routing table information in the memory upon receiving the communication message containing the processing capability ID indicating the destination of transmission and the processing capability ID indicating the source of transmission from a client side entity device or a server side entity device.

* * * * *